(12) United States Patent
You et al.

(10) Patent No.: US 9,936,486 B2
(45) Date of Patent: Apr. 3, 2018

(54) METHOD AND USER EQUIPMENT FOR REPORTING DEMODULATION REFERENCE SIGNAL INFORMATION AND METHOD AND BASE STATION FOR RECEIVING DEMODULATION REFERENCE SIGNAL INFORMATION

(71) Applicant: LG ELECTRONICS INC., Seoul (KR)

(72) Inventors: Hyangsun You, Seoul (KR); Suckchel Yang, Seoul (KR); Yunjung Yi, Seoul (KR); Jonghyun Park, Seoul (KR); Joonkui Ahn, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 182 days.

(21) Appl. No.: 14/766,721

(22) PCT Filed: Feb. 10, 2014

(86) PCT No.: PCT/KR2014/001086
§ 371 (c)(1),
(2) Date: Aug. 7, 2015

(87) PCT Pub. No.: WO2014/123398
PCT Pub. Date: Aug. 14, 2014

(65) Prior Publication Data
US 2015/0373694 A1    Dec. 24, 2015

Related U.S. Application Data

(60) Provisional application No. 61/762,328, filed on Feb. 8, 2013, provisional application No. 61/766,120, filed on Feb. 18, 2013.

(51) Int. Cl.
*H04W 72/04* (2009.01)
*H04L 5/00* (2006.01)
(Continued)

(52) U.S. Cl.
CPC ....... *H04W 72/0413* (2013.01); *H04L 5/0048* (2013.01); *H04L 5/0051* (2013.01);
(Continued)

(58) Field of Classification Search
CPC .............................. H04W 84/18; H04W 84/12
See application file for complete search history.

(56) References Cited

U.S. PATENT DOCUMENTS

2012/0051319 A1* 3/2012 Kwon ............... H04W 72/0406
                                                            370/329
2013/0029711 A1* 1/2013 Kang .................. H04W 72/046
                                                            455/509
(Continued)

FOREIGN PATENT DOCUMENTS

KR    10-2010-0089744    8/2010
KR    10-2011-0039925    4/2011
(Continued)

OTHER PUBLICATIONS

PCT International Application No. PCT/KR2014/001086, Written Opinion of the International Searching Authority dated May 27, 2014, 18 pages.

*Primary Examiner* — Zhiren Qin
(74) *Attorney, Agent, or Firm* — Lee, Hong, Degerman, Kang & Waimey

(57) ABSTRACT

The present invention provides a method and a user equipment for reporting a demodulation reference signal pattern preferred by the user equipment among demodulation reference signal patterns of which locations of demodulation reference signals, demodulation reference signal densities
(Continued)

and the like are defined differently within a predetermined time-frequency resource region, and a method and a base station for receiving the report of the preferred demodulation reference signal pattern.

16 Claims, 12 Drawing Sheets

(51) Int. Cl.
H04W 24/08 (2009.01)
H04W 24/10 (2009.01)
H04W 88/02 (2009.01)

(52) U.S. Cl.
CPC ........... *H04L 5/0094* (2013.01); *H04W 24/08* (2013.01); *H04W 24/10* (2013.01); *H04L 5/001* (2013.01); *H04L 5/0023* (2013.01); *H04L 5/0035* (2013.01); *H04L 5/0057* (2013.01); *H04W 88/02* (2013.01)

(56) References Cited

U.S. PATENT DOCUMENTS

| 2013/0182799 | A1* | 7/2013 | Geirhofer | H04L 27/00 375/340 |
| 2014/0064213 | A1* | 3/2014 | Guo | H04L 5/0048 370/329 |
| 2015/0382318 | A1* | 12/2015 | Kim | G01S 5/0215 455/456.5 |
| 2016/0006550 | A1* | 1/2016 | Cheng | H04W 72/04 370/254 |
| 2016/0192385 | A1* | 6/2016 | Tooher | H04L 5/0051 370/336 |

FOREIGN PATENT DOCUMENTS

| KR | 10-2011-0091839 | 8/2011 |
| KR | 10-2012-0060900 | 6/2012 |
| KR | 10-2012-0125321 | 11/2012 |

* cited by examiner

[p] RE occupied by CRS of port p ( p∈0, p∈0,1 or p∈0,1,2,3 )

▨ RE occupied by UE-RS of port(s) p ( p∈7, p∈8, p∈7,8 or p∈7,8,11,13 )

▧ RE occupied by UE-RS of port(s) p ( p∈9, p∈10, p∈9,10 or p∈9,10,12,14 )

METHOD AND USER EQUIPMENT FOR REPORTING DEMODULATION REFERENCE SIGNAL INFORMATION AND METHOD AND BASE STATION FOR RECEIVING DEMODULATION REFERENCE SIGNAL INFORMATION

CROSS-REFERENCE TO RELATED APPLICATIONS

This application is the National Stage filing under 35 U.S.C. 371 of International Application No. PCT/KR2014/001086, filed on Feb. 10, 2014, which claims the benefit of U.S. Provisional Application Nos. 61/762,328, filed on Feb. 8, 2013 and 61/766,120, filed on Feb. 18, 2013, the contents of which are all hereby incorporated by reference herein in their entirety.

TECHNICAL FIELD

The present invention relates to a wireless communication system and, more particularly, to a method for transmitting or receiving uplink control information and an apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled in a prescribed time unit, e.g. subframe (SF). The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DETAILED DESCRIPTION OF THE INVENTION

Technical Problems

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

In addition, a scheme for efficiently transmitting/receiving, on finite radio resources, a reference signal used when a control signal and/or a data signal transmitted by a transmitting device is restored by a receiving device is also needed.

The technical objects that can be achieved through the present invention are not limited to what has been particularly described hereinabove and other technical objects not described herein will be more clearly understood by persons skilled in the art from the following detailed description.

Technical Solutions

The present invention provides a method and a user equipment for reporting a demodulation reference signal pattern preferred by the user equipment among demodulation reference signal patterns and a method and a base station for receiving reporting of the preferred demodulation reference signal pattern. The demodulation reference signal patterns may differently define or configure locations of demodulation reference signals or demodulation reference signal densities in a predetermined time-frequency resource region.

In an aspect of the present invention, provided herein is a method for reporting demodulation reference signal (DMRS) information by a user equipment, including receiving a DMRS information reporting request; and reporting the DMRS information including indication information indicating a DMRS pattern preferred by the user equipment among a plurality of DMRS patterns based on the DMRS information reporting request.

In another aspect of the present invention, provided herein is a user equipment for reporting demodulation reference signal (DMRS) information, including a radio frequency (RF) unit and a processor configured to control the RF unit, wherein the processor causes the RF unit to receive a DMRS information reporting request and control the RF unit to report the DMRS information including indication information indicating a DMRS pattern preferred by the user equipment among a plurality of DMRS patterns based on the DMRS information reporting request.

In another aspect of the present invention, provided herein is a method for receiving demodulation reference signal (DMRS) information by a base station, including transmitting a DMRS information reporting request; and receiving the DMRS information including indication information indicating a DMRS pattern preferred by a user equipment among a plurality of DMRS patterns based on the DMRS information reporting request.

In another aspect of the present invention, provided herein is a base station for receiving demodulation reference signal (DMRS) information, including a radio frequency (RF) unit and a processor configured to control the RF unit, wherein the processor controls the RF unit to transmit a DMRS information reporting request and controls the RF unit to receive the DMRS information including indication information indicating a DMRS pattern preferred by a user equipment among a plurality of DMRS patterns based on the DMRS information reporting request among a plurality of DMRS patterns.

In each aspect of the present invention, DMRS measurement resource information indicating a DMRS measurement resource for deriving the DMRS pattern may be transmitted to the user equipment.

In each aspect of the present invention, a DMRS according to a measurement DMRS pattern for deriving the DMRS pattern on the DMRS measurement resource may be transmitted to the user equipment.

In each aspect of the present invention, a DMRS according to a measurement DMRS pattern for deriving the DMRS pattern on the DMRS measurement resource may be received by the user equipment.

In each aspect of the present invention, the DMRS measurement resource information may include at least DMRS measurement subframe information indicating a DMRS measurement subframe for deriving the DMRS pattern or resource block information indicating a resource block for deriving the DMRS pattern.

In each aspect of the present invention, the measurement DMRS pattern may correspond to a union of the plurality of DMRS patterns.

In each aspect of the present invention, DMRS pattern configuration information indicating the plurality of DMRS patterns may further be transmitted to the user equipment.

In each aspect of the present invention, the DMRS information may be reported together with channel state information (CSI) indicating at least one of a channel quality indicator, a precoding matrix indicator, and a rank indication.

In each aspect of the present invention, the DMRS information may be reported separately from channel state information (CSI) including at least one of a channel quality indicator, a precoding matrix indicator, and a rank indication.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, a reference signal can be efficiently transmitted/received. Therefore, overall throughput of a wireless communication system can be raised.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR CARRYING OUT THE INVENTION

Figure 1:
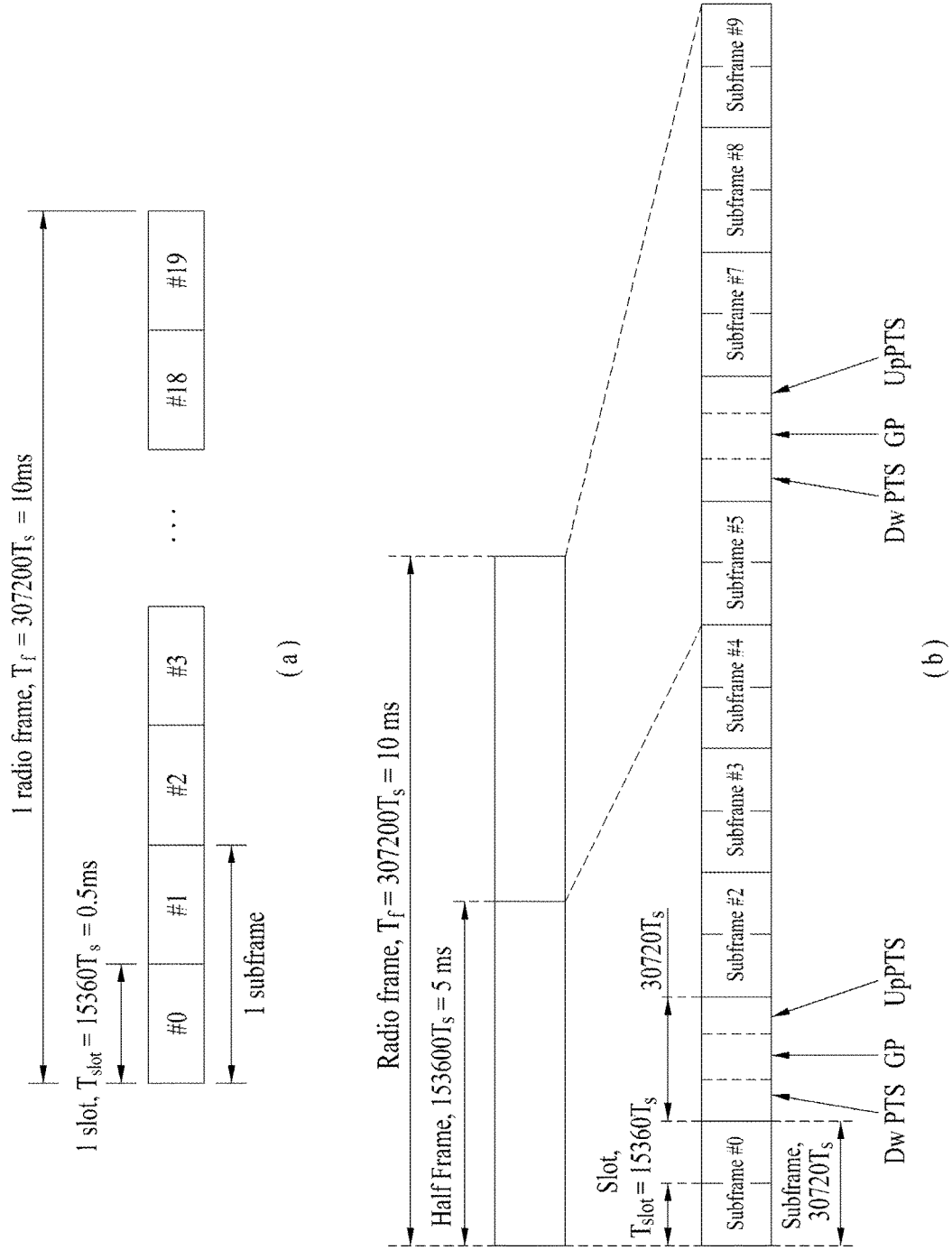
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a hand-held device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point. In the multi-node system, the same cell identity (ID) or different cell IDs may be used to transmit/receive signals to/from a plurality of nodes. If the plural nodes have the same cell ID, each of the nodes operates as a partial antenna group of one cell. If the nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In the multi-node system, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g. a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Meanwhile, a 3GPP LTE/LTE-A system uses the concept of a cell in order to manage radio resources and a cell associated with the radio resources is distinguished from a cell of a geographic region.

Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Herein below, each of carriers aggregated by carrier aggregation will be referred to as a component carrier (CC). The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PD SCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

In addition, in the present invention, a PBCH/(e)PDCCH/PDSCH/PUCCH/PUSCH region refers to a time-frequency resource region to which PBCH/(e)PDCCH/PDSCH/PUCCH/PUSCH has been mapped or may be mapped.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
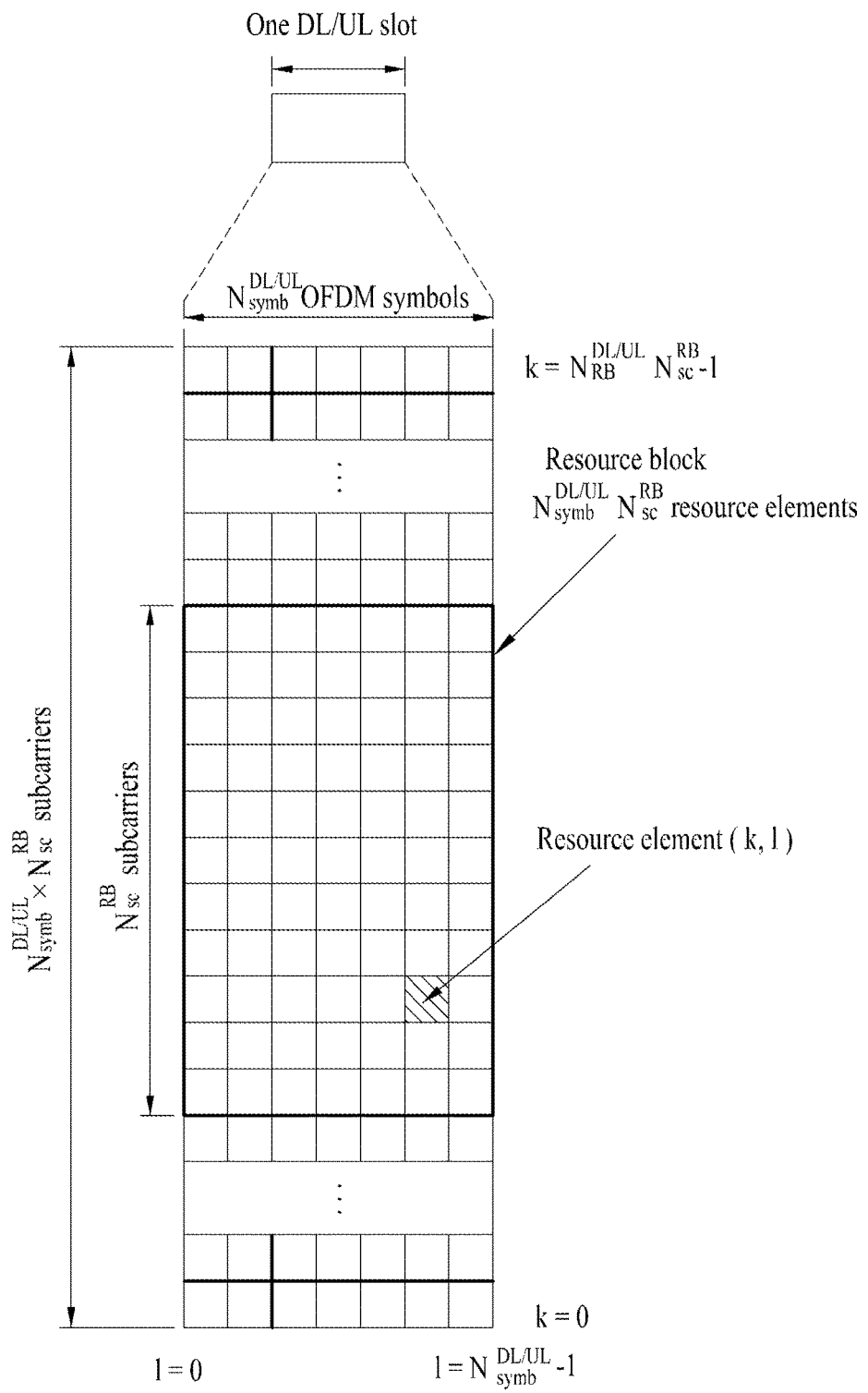
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to as a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
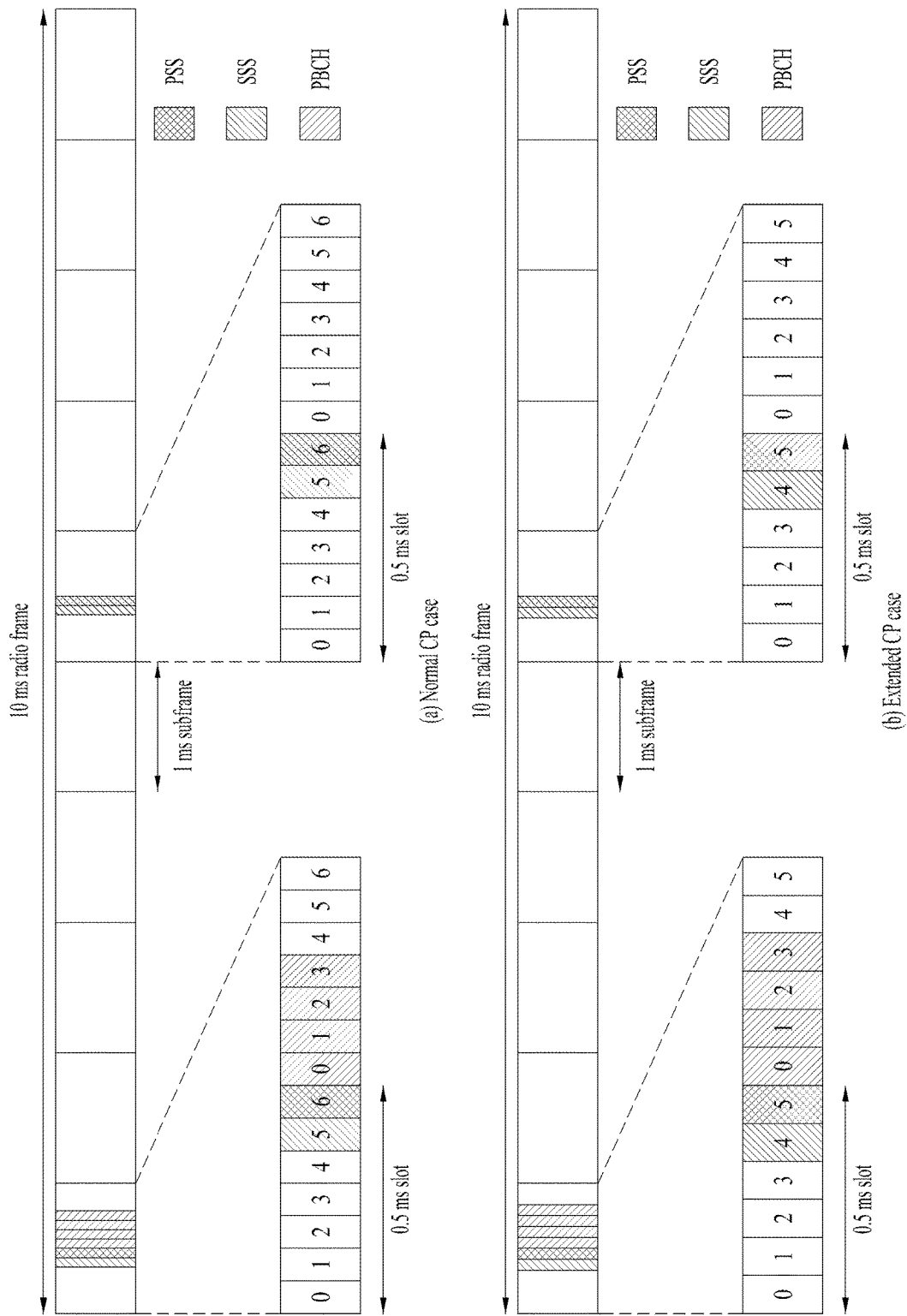
FIG. 3 illustrates a radio frame structure for transmission of a synchronization signal (SS).

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined. That is, a single antenna port transmission scheme or a transmission scheme transparent to a UE (e.g. precoding vector switching (PVS), time switched transmit diversity (TSTD), or cyclic delay diversity (CDD)) may be used for transmit diversity of an SS.

An SS may represent a total of 504 unique physical layer cell IDs by a combination of 3 PSSs and 168 SSSs. In other words, the physical layer cell IDs are divided into 168 physical layer cell ID groups each including three unique IDs so that each physical layer cell ID is a part of only one physical layer cell ID group. Accordingly, a physical layer cell ID $N^{cell}_{ID}(=3N^{(1)}_{ID}+N^{(2)}_{ID})$ is uniquely defined as number $N^{(1)}_{ID}$ in the range of 0 to 167 indicating a physical layer cell ID group and number $N^{(2)}_{ID}$ from 0 to 2 indicating the physical layer ID in the physical layer cell ID group. A UE may be aware of one of three unique physical layer IDs by detecting the PSS and may be aware of one of 168 physical layer cell IDs associated with the physical layer ID by detecting the SSS. A length-63 Zadoff-Chu (ZC) sequence is defined in the frequency domain and is used as the PSS.

Referring to FIG. 3, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

Thus, for cell search/re-search, the UE may receive the PSS and the SSS from the eNB to establish synchronization with the eNB and acquire information such as a cell ID. Thereafter, the UE may receive broadcast information in a cell managed by the eNB over a PBCH.

The message content of the PBCH are expressed in a master information block (MIB) in a radio resource control (RRC) layer. Specifically, the message content of the PBCH is shown in Table 3.

TABLE 3

```
-- ASN1START
MasterInformationBlock ::=   SEQUENCE {
    dl-Bandwidth             ENUMERATED {
                               n6, n15, n25, n50, n75, n100},
    phich-Config             PHICH-Config,
    systemFrameNumber        BIT STRING (SIZE (8)),
    spare                    BIT STRING (SIZE (10))
}
-- ASN1STOP
```

As shown in Table 3, the MIB includes DL bandwidth (BW), PHICH configuration, and a system frame number (SFN). For example, among the parameters of the MIB, the parameter dl-Bandwidth is a parameter indicating the number of RBs $N_{RB}$ on DL. This parameter may indicate a DL system bandwidth in a manner that n6 corresponds to 6 RBs, and n15 corresponds to 15 RBs. Among the parameters of the MIB, the parameter sytemFrameNumber defines 8 most significant bits of an SFN. The two least significant bits of the SFN may be implicitly obtained by decoding the PBCH. The timing of 40 ms PBCH TTI indicates two least significant bits. For example, in the 40 ms PBCH TTI, the first radio frame indicates 00, the second radio frame indicates 01, the third radio frame indicates 10, and the last radio frame indicates 11. Accordingly, the UE may be explicitly aware of information about the DL BW, SFN, and PHICH configuration by receiving the MIB. Meanwhile, information which may be implicitly recognized by the UE through reception of the PBCH includes the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH. For example, masking sequences shown below may be used according to the number of antennas.

TABLE 4

| Number of transmit antenna ports at eNode-B | PBCH CRC mask $<x_{ant,0}, x_{ant,1}, \ldots, x_{ant,15}>$ |
|---|---|
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 4 | <0, 1, 0, 1, 0, 1, 0, 1, 0, 1, 0, 1, 0, 1, 0, 1> |

The PBCH is mapped to REs after cell-specific scrambling, modulation, layer mapping, and precoding are applied thereto.

FIG. 3 illustrates exemplary mapping based on one radio frame and, in fact, an encoded PBCH is mapped to 4 subframes substantially for 40 ms. The time of 40 ms is blind-detected and explicit signaling about 40 ms is not separately present. The PBCH is mapped to 4 OFDM symbols and 72 subcarriers in one subframe. The PBCH is not mapped to REs in which RSs for 4 transmit antennas are located regardless of the number of actual transmit antennas of the eNB. For reference, even in the frame structure applied to TDD, illustrated in FIG. 1(*b*), the PBCH is mapped to 4 subframes during 40 ms and is mapped to 4 OFDM symbols and 72 subcarriers in one subframe. In TDD, the PBCH may be located on OFDM symbols 0 to 3 of slot 1 (the rear slot of subframe 0) and slot 11 (the rear slot of subframe 5) among slots 0 to 19 of a radio frame.

When a UE accesses an eNB or a cell for the first time or does not have a radio resource allocated for transmission of a signal to the eNB or the cell, the UE may perform a random access procedure. To perform the random access procedure, the UE may transmit a specific sequence over a PRACH as a random access preamble, and receive a response message for the random access preamble over a PDCCH and/or a PDSCH corresponding to the PDCCH. Thereby, a radio resource necessary for signal transmission may be allocated to the UE. In the random access procedure, a UE identifier may be configured for the UE. For example, a cell radio network temporary identifier (C-RNTI) may identify the UE in a cell, and may be temporary, semi-persistent or permanent. A temporary C-RNTI may be allocated in a temporary access process, and may become a permanent C-RNTI after contention is resolved. A semi-persistent C-RNTI is used to schedule semi-persistent resources through a PDCCH. The semi-persistent C-RNTI is also called a semi-persistent scheduling (SPS) C-RNTI. A permanent C-RNTI has a C-RNTI value allocated after contention is resolved in the random access procedure, and is used to schedule a dynamic resource.

Figure 4:
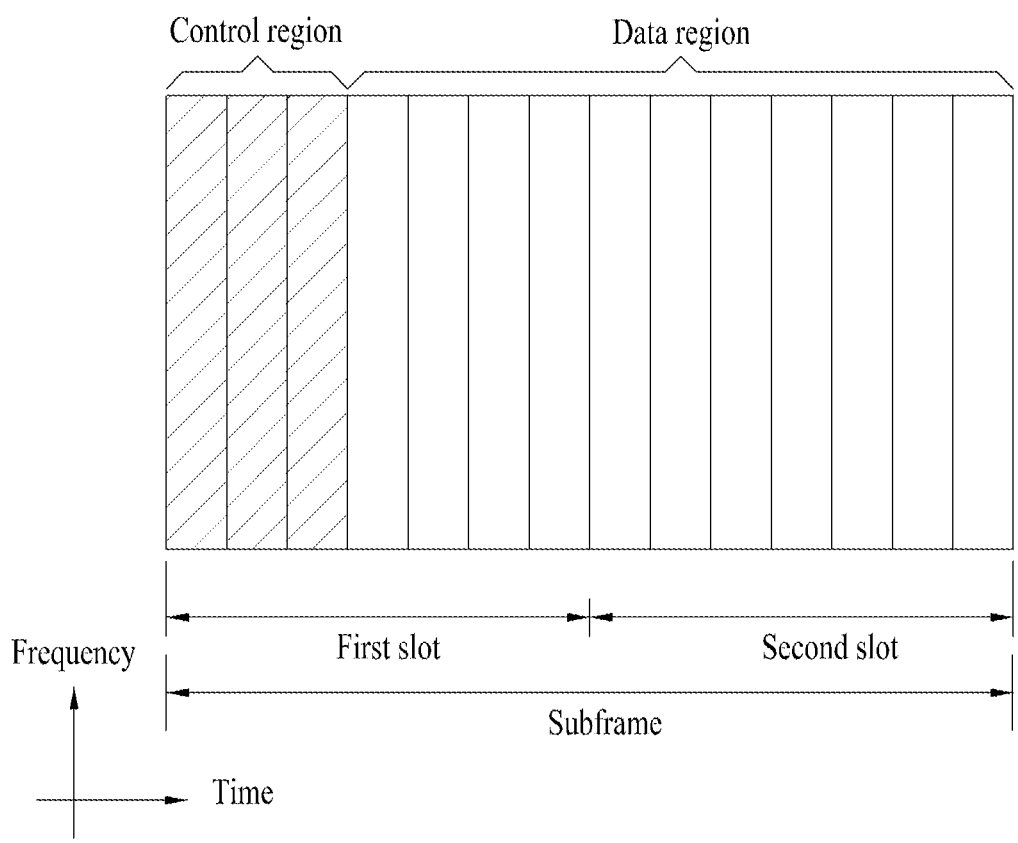
FIG. 4 illustrates the structure of a DL subframe used in a wireless communication system.

FIG. 4 illustrates the structure of a DL subframe used in a wireless communication system.

A DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). The number of DCI formats and DCI bits is determined in accordance with the number of CCEs. For example, the PCFICH and PHICH include 4 REGs and 3 REGs, respectively. Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

In order for the receiving device to restore a signal transmitted by the transmitting device, an RS for estimating a channel between the receiving device and the transmitting device is needed. RSs may be categorized into RSs for demodulation and RSs for channel measurement. CRSs defined in the 3GPP LTE system can be used for both demodulation and channel measurement. In a 3GPP LTE-A system, a UE-specific RS (hereinafter, a UE-RS) and a CSI-RS are further defined in addition to a CRS. The UE-RS is used to perform demodulation and the CSI-RS is used to derive CSI. Meanwhile, RSs are divided into a dedicated RS (DRS) and a common RS (CRS) according to whether a UE recognizes presence thereof. The DRS is known only to a specific UE and the CRS is known to all UEs. Among RSs defined in the 3GPP LTE-A system, the cell-specific RS may be considered a sort of the common RS and the DRS may be considered a sort of the UE-RS.

For reference, demodulation may be viewed as a part of the decoding process. In the present invention, the terms demodulation and decoding are used interchangeably.

Figure 5:
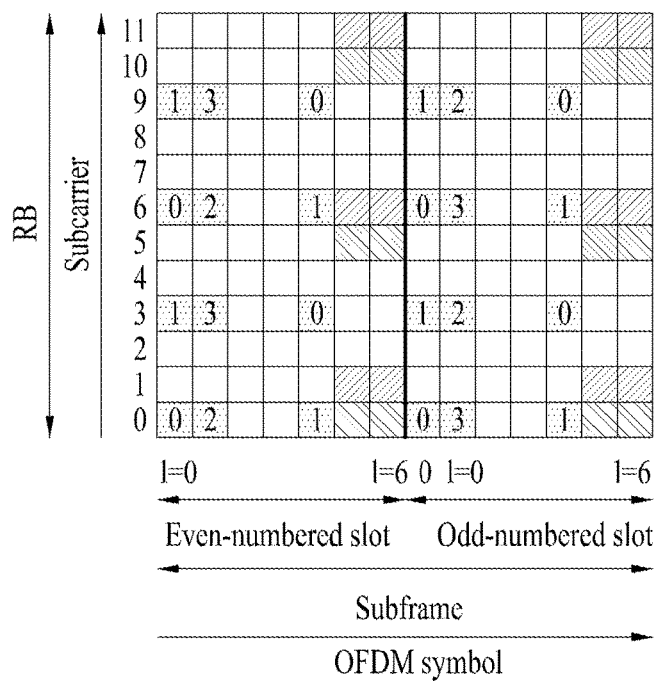
FIG. 5 illustrates configuration of cell specific reference signals (CRSs) and user specific reference signals (UE-RS).

FIG. 5 illustrates configuration of cell specific reference signals (CRSs) and user specific reference signals (UE-RS). In particular, FIG. 5 shows REs occupied by the CRS(s) and UE-RS(s) on an RB pair of a subframe having a normal CP.

In an existing 3GPP system, since CRSs are used for both demodulation and measurement, the CRSs are transmitted in all DL subframes in a cell supporting PDSCH transmission and are transmitted through all antenna ports configured at an eNB.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of DRS. Since the UE-RS and the CRS are used for demodulation, the UE-RS and the CRS may be regarded as demodulation RSs in terms of usage. Since the CSI-RS and the CRS are used for channel measurement or channel estimation, the CSI-RS and the CRS may be regarded as measurement RSs.

UE-RSs are transmitted on antenna port(s) p=5, p=7, p=8 or p=7,8, . . . , ν+6 for PDSCH transmission, where ν is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may be lowered compared to that of the CRS.

Figure 7:
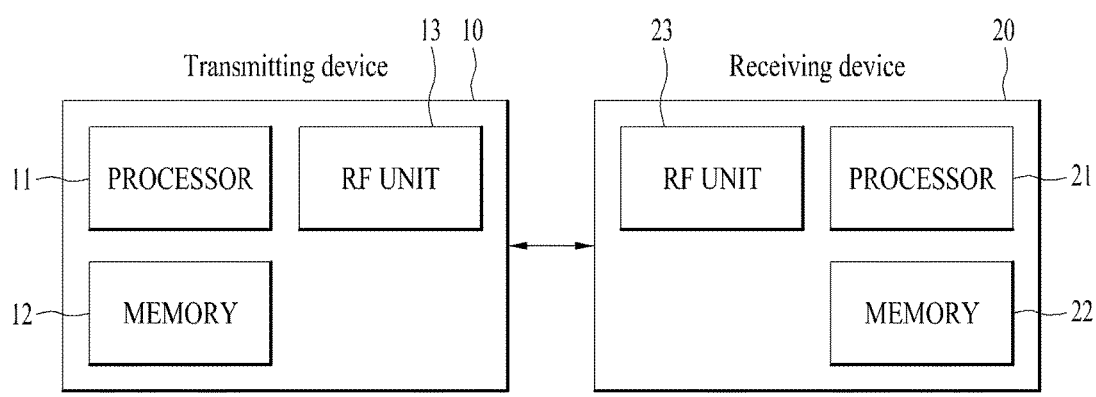
FIG. 7 is a block diagram illustrating elements of a transmitting device 10 and a receiving device 20 for implementing the present invention.

In the 3GPP LTE-A system, the UE-RSs are defined in a PRB pair. Referring to FIG. 7, in a PRB having frequency-domain index $n_{PRB}$ assigned for PDSCH transmission with respect to p=7, p=8, or p=7,8, . . . , ν+6, a part of UE-RS sequence r(m) is mapped to complex-valued modulation symbols $a_{k,l}^{(p)}$ in a subframe according to the following equation.

$$a_{k,l}^{(p)} = w_p(l') \cdot r(3 \cdot l' \cdot N_{RB}^{max,DL} + 3 \cdot n_{PRB} + m')$$ [Equation 1]

where $w_p(i)$, l', m' are given as follows.

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases}$$ [Equation 2]

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, or 8 (see Table 2)} \\ l' \bmod 2 + 2 + 3\lfloor l'/2 \rfloor & \text{if in a special subframe with configuration 1, 2, 6, or 7 (see Table 2)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7 (see Table 2)} \\ 0, 1 & \text{if } n_s \bmod 2 = 0 \text{ and not in special subframe with configuration 1, 2, 6, or 7 (see Table 2)} \\ 2, 3 & \text{if } n_s \bmod 2 = 1 \text{ and not in special subframe with configuration 1, 2, 6, or 7 (see Table 2)} \end{cases}$$

$$m' = 0, 1, 2$$

where $n_s$ is the slot number within a radio frame and an integer among 0 to 19. The sequence $\overline{w}_p(i)$ for normal CP is given according to the following equation.

TABLE 6

| Antenna port p | $[\overline{w}_p(0)\ \overline{w}_p(1)\ \overline{w}_p(2)\ \overline{w}_p(3)]$ |
| --- | --- |
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port p∈{7,8, . . . , ν+6}, the UE-RS sequence r(m) is defined as follows $$r(m) = \frac{1}{\sqrt{2}}(1 - 2 \cdot c(2m)) + j\frac{1}{\sqrt{2}}(1 - 2 \cdot c(2m+1)),$$ [Equation 3]

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

c(i) is a pseudo-random sequence defined by a length-31 Gold sequence. The output sequence c(n) of length $M_{PN}$, where n=0,1, . . . , $M_{PN}$−1, is defined by the following equation.

$$c(n) = (x_1(n+N_C) + x_2(n+N_C)) \bmod 2$$

$$x_1(n+31) = (x_1(n+3) + (n)) \bmod 2$$

$$x_2(n+31) = (x_2(n+3) + x_2(n+2) + (n+1) + x_2(n)) \bmod 2$$ [Equation 4]

where $N_C$=1600 and the first m-sequence is initialized with $x_1(0)$=1, $x_1(n)$=0, n=1,2, . . . , 30. The initialization of the second m-sequence is denoted by $c_{init}=\sum_{i=0}^{30}x_2(i)\cdot 2^i$ with the value depending on the application of the sequence.

In Equation 3, the pseudo-random sequence generator for generating c(i) is initialized with $c_{init}$ at the start of each subframe according to the following equation.

$$c_{init}=(\lfloor n_s/2\rfloor+1)\cdot(2n_{ID}^{(nSCID)}+1)\cdot 2^{16}+n_{SCID} \quad \text{[Equation 5]}$$

In Equation 5, the quantities $n^{(i)}{}_{ID}$, i=0,1, which is corresponding to $n_{ID}{}^{(nSCID)}$, is given by a physical layer cell identifier $N^{cell}{}_{ID}$ if no value for $n^{DMRS,i}{}_{ID}$ is provided by higher layers or if DCI format 1A, 2B or 2C is used for DCI format associated with the PDSCH transmission, and given by $n^{DMRS,i}{}_{ID}$ otherwise.

In Equation 5, the value of $n_{SCID}$ is zero unless specified otherwise. For a PDSCH transmission on antenna ports 7 or 8, $n_{SCID}$ is given by the DCI format 2B or 2D. DCI format 2B is a DCI format for resource assignment for a PDSCH using a maximum of two antenna ports having UE-RSs. DCI format 2C is a DCI format for resource assignment for a PDSCH using a maximum of 8 antenna ports having UE-RSs.

Figure 6:
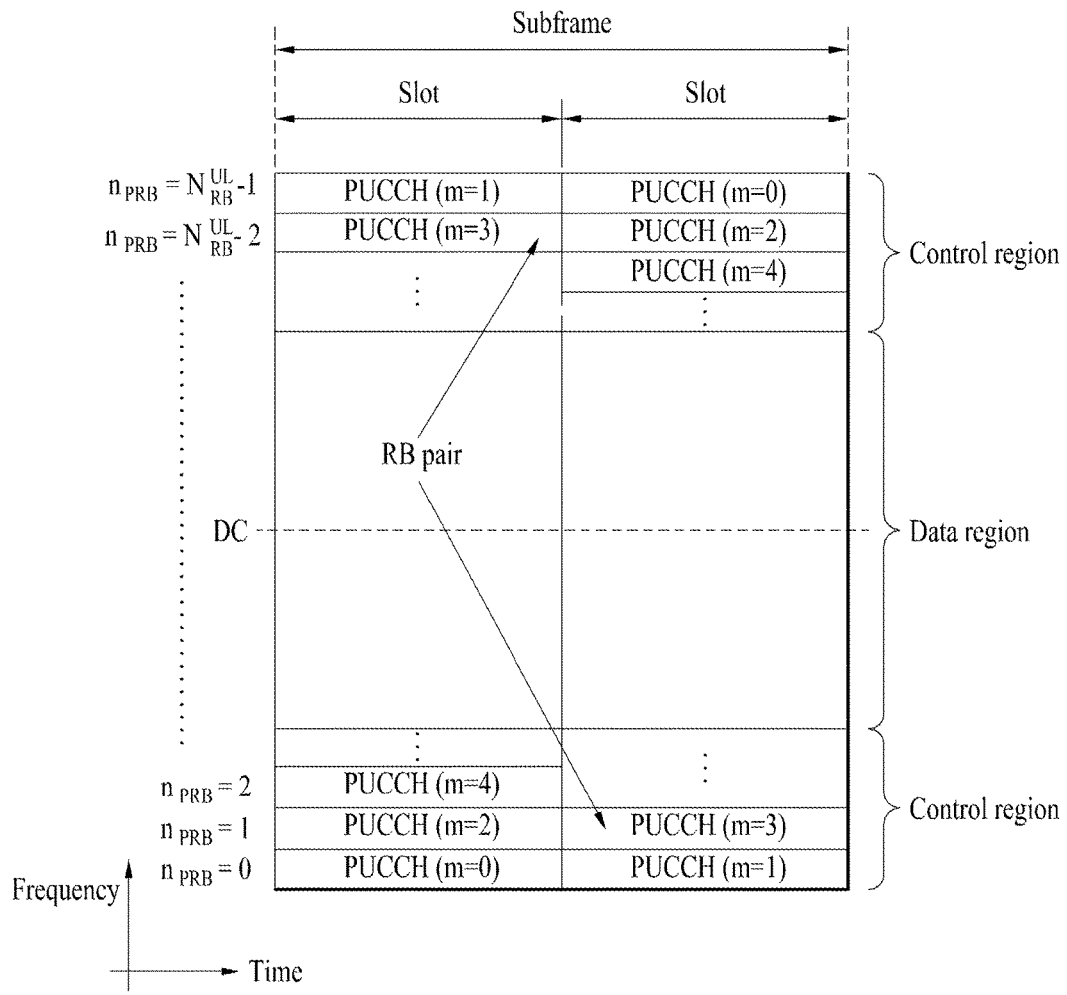
FIG. 6 illustrates the structure of a UL subframe used in a wireless communication system.

FIG. 6 illustrates the structure of a UL subframe used in a wireless communication system.

Referring to FIG. 6, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

If a UE uses a single carrier frequency division multiple access (SC-FDMA) scheme in UL transmission, a PUCCH and a PUSCH cannot be simultaneously transmitted on one carrier in a 3GPP LTE release-8 or release-9 system in order to maintain a single carrier property. In a 3GPP LTE release-10 system, support/non-support of simultaneous transmission of the PUCCH and the PUSCH may be indicated by higher layers.

FIG. 7 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into $N_{layer}$ layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

Figure 8:
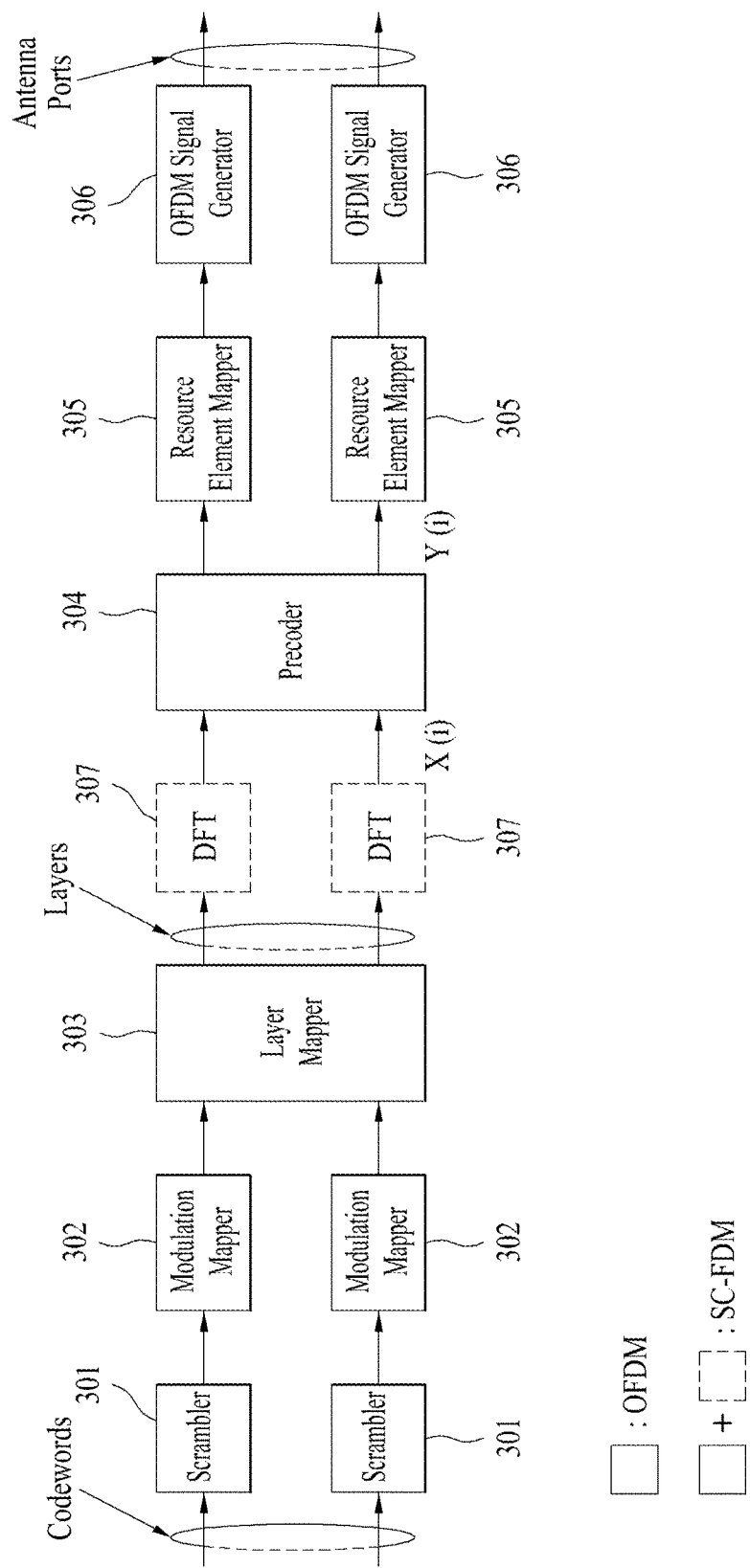
FIG. 8 illustrates an overview of physical channel processing.

FIG. 8 illustrates an overview of physical channel processing. A baseband signal representing a PUSCH or a PDSCH may be defined by a processing procedure of FIG. 8.

Referring to FIG. 8, a transmitting device may include scramblers 301, modulation mappers 302, a layer mapper 303, a precoder 304, RE mappers 305, and OFDM signal generators 306.

The transmitting device 10 may transmit more than one codeword. The scramblers 301 scramble the coded bits of each codeword, for transmission on a physical channel.

The modulation mappers 302 modulate the scrambled bits, thus producing complex-valued modulation symbols. The modulation mappers 302 modulate the scrambled bits to complex-valued modulation symbols representing positions on a signal constellation in a predetermined modulation scheme. The modulation scheme may be, but not limited to, any of m-phase shift keying (m-PSK) and m-quadrature amplitude modulation (m-QAM).

The layer mapper 303 maps the complex-valued modulation symbols to one or several transmission layers.

The precoder 304 may precode the complex-valued modulation symbols on each layer, for transmission through the antenna ports. More specifically, the precoder 304 generates antenna-specific symbols by processing the complex-valued modulation symbols for multiple transmission antennas in a MIMO scheme, and distributes the antenna-specific symbols to the RE mappers 305. That is, the precoder 304 maps the transmission layers to the antenna ports. The precoder 304 may multiply an output x of the layer mapper 303 by an $N_t \times M_t$ precoding matrix W and output the resulting product in the form of an $N_t \times M_F$ matrix z. Here, $N_t$ is corresponding to the number of transmission antennas, and $M_t$ is corresponding the number of layers. Since the precoder 304 is differently configured according to the precoding matrix, if the same precoding matrix is applied to signals, this indicates that the same precoder is applied to signals in the present invention and if different precoding matrices are applied to signals, this indicates that different precoders are applied to signals in the present invention.

The RE mappers 305 map/allocate the complex-valued modulation symbols for the respective antenna ports to REs. The RE mappers 305 may allocate the complex-valued modulation symbols for the respective antenna ports to appropriate subcarriers, and may multiplex them according to UEs.

The OFDM signal generators 306 modulate the complex-valued modulation symbols for the respective antenna ports, that is, the antenna-specific symbols through OFDM or SC-FDM modulation, thereby producing a complex-valued time domain orthogonal frequency division multiplexing (OFDM) or single carrier frequency division multiplexing (SC-FDM) symbol signal. The OFDM signal generators 306 may perform inverse fast Fourier transform (IFFT) on the antenna-specific symbols and insert a cyclic prefix (CP) into the resulting IFFT time domain symbol. Digital-to-analog conversion, frequency upconversion, etc applied to the OFDM symbol and then transmitted through the transmission antennas to a receiving device 20. The OFDM signal generators 306 may include an IFFT module, a CP inserter, a digital-to-analog converter (DAC), a frequency upconverter, etc.

In the meantime, if the UE or eNB applies the SC-FDMA scheme to codeword transmission, the transmitter or processor may include a discrete Fourier transform (DFT) module 307 (or fast Fourier transform (FFT) module). The DFT module 307 performs DFT or FFT (hereinafter referred to as DFT/FFT) on the antenna specific symbol, and outputs the DFT/FFT symbol to the resource element mapper 305.

The receiving device 20 operates in the reverse order to the operation of the transmitting device 10. Specifically, the receiving device may include a signal recoverer for recovering a received signal into a baseband signal, a multiplexer for multiplexing a received and processed signal, and a channel demodulator for demodulating a multiplexed signal stream into a codeword. The signal recoverer, the multiplexer, and the channel demodulator may be comprised of one integrated module or independent modules for performing respective functions. For example, the signal recoverer may include an analog-to-digital converter (ADC) for converting an analog signal into a digital signal, a CP remover for removing a CP from the digital signal, an FFT module for generating a frequency-domain symbol by performing FFT upon the CP-removed signal, and an RE demapper/equalizer for recovering the frequency-domain symbol into an antenna-specific symbol. The multiplexer recovers the antenna-specific symbol into a transmission layer and the channel demodulator recovers the transmission layer into the codeword that the transmitting device desires to transmit.

Meanwhile, upon receiving signals transmitted by an SC-FDMA scheme, the receiving device 20 further includes an inverse discrete Fourier transmission (IFFT) module (or an inverse fast Fourier transform (IFFT) module). The IDFT/IFFT module performs IDFT/IFFT upon the antenna-specific symbols recovered by the RE demapper and transmits the IDFT/IFFT-processed symbol to the multiplexer.

For reference, the processor 11 of the transmitting device 10 may be configured to include the scramblers 301, the modulation mappers 302, the layer mapper 303, the precoder 304, the RE mappers 305, and the OFDM signal generators 306. Likewise, the processor 21 of the receiving device 20 may be configured to include the signal recoverer, the multiplexer, and the channel demodulator.

If RRH technology, cross-carrier scheduling technology, etc. are introduced, the amount of PDCCHs that an eNB should transmit is gradually increased. However, since the size of a control region in which the PDCCHs are capable of being transmitted is invariant, transmission of the PDCCHs serves as a bottleneck of system performance. Although channel quality can be improved by introduction of the above-described multi-node system and application of various communication schemes, introduction of a new control channel has been demanded in order to apply an existing communication scheme and carrier aggregation technology to a multi-node environment. As such, configuring the new control channel in a data region (hereinafter, a PDSCH region) rather than an existing control region (hereinafter, a PDCCH region) has been discussed. Hereinafter, the new control channel will be referred to as an enhanced PDCCH (ePDCCH). The ePDCCH may be configured on back OFDM symbols starting from a configured OFDM symbol, rather than on front OFDM symbols of a subframe. The ePDCCH may be configured using contiguous frequency resources or may be configured using non-contiguous frequency resources for frequency diversity. Using the ePDCCH enables transmission of control information per node to a UE and can also solve shortage of the existing PDCCH region. For reference, a PDCCH is transmitted through the same antenna port(s) as antenna port(s) configured for transmission of a CRS and the UE configured to decode the PDCCH may demodulate or decode the PDCCH using the CRS. Unlike the PDCCH transmitted based on the CRS, the ePDCCH may be transmitted based on a demodulation RS (hereinafter, a DMRS). Therefore, the UE may decode/demodulate the PDCCH based on the CRS and decode/demodulate the ePDCCH based on the DMRS. The DMRS associated with the ePDCCH is transmitted over the same antenna port $p \in \{107,108,109,110\}$ as a physical resource of the ePDCCH and is present for demodulation of the ePDCCH only when the ePDCCH is associated with the corresponding antenna port. In addition, the DMRS associated with the ePDCCH is transmitted only on PRB(s) to which the ePDCCH is mapped. For example, REs occupied by UE-RS(s) of antenna port 7 or 8 in FIG. 5 may be occupied by DMRS(s) of antenna port 107 or 108 in a PRB to which the ePDCCH is mapped and REs occupied by UE-RS(s) of antenna port 9 or 10 in FIG. 5 may be occupied by DMRS(s) of antenna port 109 or 110 in the PRB to which the ePDCCH is mapped. Consequently, like a UE-RS for demodulating a PDSCH, the DMRS for demodulating the ePDCCH uses a predetermined number of REs per RB pair for transmission regardless of a UE or a cell if the types of ePDCCHs are equal and the numbers of layers are equal. Hereinafter, both the PDCCH and the ePDCCH will be simply referred to as the PDCCH except in cases specific to the ePDCCH. The present invention may be applied to an ePDCCH, a PUSCH, and a PDSCH and/or a PUSCH scheduled by the ePDCCH, as well as a PDCCH, a PUCCH, and a PDSCH and/or a PUSCH scheduled by the PDCCH.

In a future LTE-A system, generating a new carrier type (NCT) CC and using this CC alone or as an SCC is considered. In the case of a legacy carrier type (LCT) CC, radio resources usable for transmission/reception of physical UL/DL channels and radio resources usable for transmission/reception of physical UL/DL signals among radio resources operating on the LCT CC are predetermined as described in FIGS. 1 to 6. In other words, the LCT CC needs to be configured to carry the physical channels/signals not through an arbitrary time frequency on an arbitrary time resource but through a specific time frequency on a specific time resource according to the type of a physical channel or a physical signal. For example, PDCCHs may be configured only on front OFDM symbol(s) among OFDM symbols of a DL subframe and a PDSCH cannot be configured on the front OFDM symbol(s) to which the PDCCHs are likely to be mapped. As another example, CRS(s) corresponding to antenna port(s) of an eNB are transmitted in every subframe on REs illustrated in FIG. 8 over all bands irrespective of a DL system BW of a CC. Then, if the number of antenna ports of the eNB is one, REs indicated by '0' in FIG. 8 cannot be used for another DL signal transmission and, if the number of antenna ports of the eNB is four, REs indicated by '0', '1', '2', and '3' in FIG. 8 cannot be used for another DL signal transmission. In addition, various constraints on configuration of the LCT CC are present and such constraints have increased according to development of a communication system. Since some of these constraints were created due to a communication technology level at the time when the constraints were imposed, there are unnecessary constraints according to development of communication technology. In addition, a constraint on legacy technology and a constraint on new technology may be simultaneously present for the same purpose. In this way, as constraints have significantly increased, constraints introduced for development of the communication system make it rather difficult to efficiently use radio resources of the CC. For example, although a CRS need not be transmitted on all antenna ports in every subframe due to introduction of a CSI-RS and a UE-RS, the CRS is present per antenna port in every subframe in order to support UEs that cannot support the CSI-RS and UE-RS. However, since UEs that cannot support the CSI-RS/UE-RS will disappear over time, the necessity of using a legacy CRS having significant RS overhead together with the CSI-RS and UE-RS is gradually being reduced. In consideration of this state, it is necessary to configure the CC free from the constraints of the CRS. Accordingly, introduction of an NCT CC, which is free from unnecessary constraints due to advances in communication technology and is capable of being configured according to simpler constraints than conventional constraints, has been discussed. Since the NCT CC is not configured according to constraints of a legacy system, the NCT CC cannot be recognized by a UE implemented by the legacy system.

In the present invention, the NCT CC may not satisfy at least one of a constraint indicating that a CRS should be configured in a cell in every DL subframe, a constraint indicating that the CRS should be configured in the cell per antenna port of an eNB, and a constraint indicating that the CRS should be transmitted over all bands, and a constraint indicating that a predetermined number of front OFDM symbols of a DL subframe should be reserved for transmission of a control channel such as a PDCCH over all frequency bands of the corresponding CC. For example, on the NCT CC, the CRS may be configured not in every subframe but in a predetermined number (>1) of subframes. Alternatively, on the NCT cell, only the CRS for one antenna port (e.g. antenna port 0) may be configured irrespective of the number of antenna ports of the eNB. Alternatively, a TRS for tracking of time synchronization and/or frequency synchronization may be newly defined instead of a legacy CRS for channel state measurement and demodulation and the TRS may be configured in some subframes and/or on some frequency resources of the NCT CC. That is, on the LCT CC, the CRS is fixedly transmitted over all bands on at least some front OFDM symbols in all subframes, in terms of RS transmission. In contrast, on the NCT CC, fixed CRS transmission having high density may be omitted or may be remarkably reduced. In addition, CRS transmission is fixed on the LCT CC, whereas the transmission time, transmission band, and transmission antenna ports of the CRS may be configurable on the NCT CC. Alternatively, on the NCT CC, a PDSCH may be configured on front OFDM symbols, a PDCCH may be configured in a legacy PDSCH region rather than on the front OFDM symbols, or the PDSCH may be configured using some frequency resources of the PDCCH. For example, the TRS may be transmitted over all frequency bands or some frequency bands in every integer multiple of 5 ms through one port. Hereinafter, a CRS or a new RS, used only for tracking, will be referred to as a TRS. Since the TRS is not used for demodulation, the TRS corresponds to an RS for measurement in terms of usage. Moreover, DL resources can be efficiently used on the NCT CC by improving DL reception performance and minimizing RS overhead, through UE-RS based DL data reception and (configurable) CSI-RS based channel state measurement having relatively low density. For example, on the LCT CC, a CRS is transmitted on DL as default, whereas, on the NCT CC, only a UE-RS for DL data demodulation and a CSI-RS for channel state measurement may be transmitted without the CRS.

In CA, the NCT CC may be used as an SCC. Since the NCT CC that is usable as the SCC is not considered to be used by an LCT UE, the LCT UE need not perform cell search, cell selection, cell reselection, etc. on the NCT CC. If the NCT CC is not used as a PCC and is used only as the SCC, unnecessary constraints can be reduced as compared with the LCT CC which can also be used as the PCC and thus cells can be more efficiently used. However, using the NCT CC as a stand-alone NCT CC which is also capable of being used as an independent PCC will be considered in the future.

When a plurality of CCs is used through aggregation in a legacy LTE/LTE-A system, if a PCC is present which can perform access to a stand-alone CC and transmission/reception of a control signal and data by enabling data transmission, cell ID acquisition, system information transmission, and physical control signal transmission and if an SCC is configured which can perform data transmission/reception only through aggregation with the PCC, it has been assumed that UL/DL frame time synchronization of the SCC is equal to time synchronization of the PCC on the assumption that CCs that are not far away from each other in the frequency domain are aggregated.

In addition, in the legacy LTE/LTE-A system, only the case in which aggregated CCs are used by one node and center frequencies of the CCs are adjacent to each other so that frequency characteristics are similar has been considered. However, the case in which CCs configured for the UE are used by a plurality of nodes separated by a predetermined distance or more rather than by one node may be considered and frequency aggregation between inter-frequencies having different frequency characteristics may also be considered. If different nodes participate in CA using different CCs or the same CC, that is, if different cells participate in CA using the same CC or different CCs, the aggregated CC(s) may be connected by an ideal backhaul or a non-ideal backhaul. The ideal backhaul refers to a backhaul having very high throughput and very low latency, such as a dedicated point-to-point connection using an optical fiber or a line-of-sight (LOS) microwave link. In contrast, the non-ideal backhaul refers to a typical backhaul widely used in the market, such as a digital subscriber line (xDSL) or a non-line-of-sight (NLOS) microwave link. It may be assumed that the ideal backhaul has no latency in information exchange between cells or nodes.

Meanwhile, introduction of a small cell having smaller size, i.e. narrower coverage than an existing cell has been considered. The existing cell having wider coverage than the small cell is called a macro cell. The small cell provides services in a narrower range than a range within which the existing cell or a CC can provide services by power or frequency characteristics of the corresponding cell. Since the small cell using a low power node can be easily arranged in indoor and outdoor hot spots, the small cell can be usefully used to handle explosive increase in communication traffic. The low power node generally refers to a node having lower transmit power than transmit power of a macro node and a normal eNB. For example, a pico eNB and a femto eNB may be used as low power nodes. If the small cell is used in the case in which a UE having low mobility requires high throughput, data transmission efficiency can be raised. For deployment of the small cell, an LCT CC may be used or an NCT CC may be used. The small cell may be deployed in a current frequency band or in a frequency band which is not currently used but can be used in the future. If the cell is deployed using a high frequency band (e.g. a band of 3.5 GHz), channel characteristics may be variously changed according to time, frequency, or (geographical/spatial) position. Meanwhile, since coverage of the small cell is narrow, if a UE has high mobility, the UE needs to immediately leave the coverage of the small cell and be handed over to another cell. For this reason, overhead in small cells more frequently occurs than in normal cells. However, if a small cell is used for a UE having very low mobility, channel characteristics for the UE in the small cell are not abruptly changed and can be stably maintained.

A UE may be placed in various channel environments according to characteristics of a cell by which the UE is serviced, surrounding circumstances, or UE mobility. Hence, a channel environment that each UE experiences may differ according to a UE. Meanwhile, a DMRS may be used for data demodulation and the density and time/frequency positions of DMRSs (i.e. a DMRS pattern) that can maximize throughput of data transmitted to the UE may differ according to a channel environment. Therefore, data throughput of the UE can be raised by using the most suitable DMRS pattern according to a channel environment of the UE. As one method for determining a DMRS pattern to be used for the UE, the UE may select a DMRS pattern which is most suitable for a channel environment thereof and inform the eNB of the selected DMRS pattern. The present invention proposes a scheme in which the UE selects the most suitable DMRS pattern in consideration of a channel environment thereof and feeds back the selected DMRS pattern to the eNB. The embodiments of the present invention, which will be described herein below, may be applied not only to a PBCH, a PHICH, an SIB, and a PDSCH, defined in a legacy system but also to a PBCH, a PHICH, an SIB, a PDSCH, and an (e)PDCCH, which are newly defined to use a format and time/frequency resource different from those used in the legacy PBCH, PHICH, SIB, and PDSCH. The embodiments of the present invention may also be applied to a PBCH, a PHICH, an SIB, a PDSCH, and an (e)PDCCH, transmitted on an NCT CC which has no compatibility with a legacy UE, i.e. which cannot be used for signal transmission/reception by the legacy UE. Hereinafter, a legacy PBCH and a new PBCH will be referred to as an (e)PBCH and a legacy PHICH and a new PHICH will be referred to as an (e)PHICH.

A legacy LTE-A system performs data demodulation using one DMRS pattern determined per antenna port, whereas a DMRS pattern according to the present invention may UE-specifically vary. The present invention propose that a UE placed in various environments determine a DMRS pattern which is the most suitable for a channel environment of the UE and feedback the DMRS pattern to an eNB. For this end, the eNB may inform the UE of the types of DMRS patterns that can be used by the UE and the UE may inform the eNB of a desired DMRS pattern among the DMRS patterns. For instance, the UE may select the DMRS pattern in consideration of the following environment factors.

(1) UE mobility
(2) Low channel diversity (i.e. a channel is constant over a relatively long period) (e.g. low Doppler spread)
(3) UE SNR range
(4) UE computed CQI
(5) UE computed RI
(6) UE configured transmission mode To search for an optimal DMRS pattern in all environments, the UE may perform estimation for all possible combinations and feedback the estimated result. However, this is undesirable because estimation for combinations of all environment factors and/or estimation for all DMRS patterns increase the processing power and complexity of the UE. Therefore, measurement DMRS patterns given to the UE and patterns that the UE should select as candidate DMRS patterns are desirably limited to some patterns. The candidate DMRS patterns represent DMRS patterns capable of being used for DMRS transmission for a specific UE and the measurement DMRS patterns represent DMRS patterns that the UE should measure to select a DMRS pattern suitable therefor. A DMRS pattern suitable for the UE may be selected from among the candidate DMRS pattern(s) and the measurement DMRS patterns may be used in order to evaluate which DMRS pattern among the candidate DMRS pattern(s) is suitable for the UE. To prevent increase in the processing power and complexity of the UE, the present invention discusses the measurement DMRS patterns for performing measurement according to various environments of the UE and the candidate DMRS patterns to be evaluated to select the DMRS pattern suitable for the UE.

For example, in an environment in which mobility of the UE is low and a channel is not frequently changed, candidate patterns may be considered in terms of DMRS reduction. A scheme for causing the UE to estimate channel states of contiguous PRBs together on the assumption that the same precoder is applied to DMRSs on the contiguous PRBs is referred to as PRB bundling. If PRB bundling is configured, the UE assumes that precoding granularity is a plurality of resource blocks in the frequency domain. For example, if PMI feedback is configured for the UE, the UE may decode data received on contiguous PRBs on the assumption that the same precoder is applied to contiguous PRBs that are scheduled for data transmission to the UE, i.e. on the assumption that PRB bundling is configured. More specifically, a UE configured as a specific transmission mode (e.g. transmission mode 9) with respect to a given serving CC c may assume that precoding granularity is multiple resource blocks if PMI/RI feedback is configured. Precoding resource block groups (PRGs) having a size P' depending upon a fixed system BW partition the system BW and each PRG is composed of contiguous PRBs. If $N^{DL}_{RB}$ mod P'>0, one of the PRGs has a size of $N^{DL}_{RB} - P' \lfloor N^{DL}_{RB}/P' \rfloor$. The PRG size does not increases starting at the lowest frequency. The UE for which PMI/RI feedback is configured may receive or decode a PDSCH on the assumption that the same precoder is applied to all scheduled PRBs in a PRG. A PRG size that can be assumed by the UE with respect to a given system BW may be as follows.

TABLE 7

| System Bandwidth ($N^{DL}_{RB}$) | PRG Size (P') (PRBs) |
|---|---|
| ≤10 | 1 |
| 11-26 | 2 |
| 27-63 | 3 |
| 64-110 | 2 |

A PRG size, which is the number of contiguous PRBs to which the same precoder is assumed to be applied, is referred to as a PRB bundling window. In the present invention, an option in which a DMRS is not transmitted in one or multiple PRBs in a PRB bundling window may be considered. Therefore, the present invention may provide a measurement DMRS pattern in consideration of PRB bundling.

As another example, in the present invention, the measurement DMRS pattern may be associated with a reported RI or CQI. For example, if a high RI is reported, since performance of channel estimation is very important, the measurement DMRS pattern should be a pattern supporting multiple layers for multiple antenna ports (e.g. a pattern supporting 8 layers if RI=8) and candidate DMRS patterns may be restricted to patterns capable of supporting a higher layer. In more detail, when an eNB informs a UE of measurement DMRS pattern(s) for DMRS feedback, the eNB may inform the UE of the measurement DMRS patterns using the most recently reported RI or CQI. If the reported RI or CQI is ambiguous or reliability of reported data is out-of-date, the eNB may feedback a basic pattern to the UE.

■ A. Default DMRS Pattern

In the case in which a DMRS pattern is UE-specific and a specific UE feeds back suitable DMRS pattern information in order to select a DMRS pattern to be used thereby, upon first accessing a specific cell, the UE is unaware of a DMRS pattern to be used to receive an (e)PBCH, an ePDCCH, a PDSCH, etc. from the cell. Accordingly, the UE needs to be aware of the DMRS pattern to be used to receive the (e)PBCH, the ePDCCH, the PDSCH, etc., until the UE feeds back a DMRS pattern to be used thereby in the cell and an eNB transmits data using the DMRS pattern. In the present invention, such a DMRS pattern is referred to as a default DMRS pattern. The default DMRS pattern may be cell-specific. The default DMRS pattern may be pre-shared by the eNB and the UE. The UE may use the default DMRS pattern to demodulate data such as an (e)PBCH, an ePDCCH, an ePHICH, an SIB, a PDSCH, etc. until the UE first accesses a cell, determines a DMRS pattern to be used thereby, and informs the eNB of the determined DMRS pattern or until the eNB informs the UE of a DMRS pattern to be used by the UE. The UE may use the default DMRS pattern to receive cell-specific information (e.g. an (e)PBCH, a common search space, an SIB, or a cell-specific PDSCH).

The default DMRS pattern may be predefined and shared by the eNB and the UE. The default DMRS pattern may be a legacy DMRS pattern used in the LTE-A system (refer to FIG. 5). If the legacy DMRS pattern is defined as the default DMRS pattern, a legacy UE that can only uses the legacy DMRS pattern is capable of smoothly operating in a corresponding cell. The UE may receive the (e)PBCH, ePDCCH, (e)PHICH, SIB, PDSCH, etc. using a DMRS according to the default DMRS pattern until the UE knows a DMRS pattern to be used thereby.

Alternatively, the UE may detect the default DMRS pattern by blind detecting the PBCH. The eNB may transmit the PBCH using the default DMRS and the UE may detect a DMRS pattern used for the PBCH and recognize the detected DMRS pattern as a default DMRS by attempting to decode the PBCH, i.e. by blind decoding the PBCH, using prescheduled DMRS patterns. The UE may receive the PBCH, ePDCCH, (e)PHICH, SIB, PDSCH, etc. using a DMRS according to the default DMRS pattern until the UE is aware of a DMRS pattern to be used thereby.

Alternatively, the eNB may inform the UE of the default DMRS pattern through the PBCH. The UE may receive the (e)PBCH carrying default DMRS pattern information using a CRS or using the legacy DMRS pattern. The UE may receive the ePDCCH, (e)PHICH, SIB, PDSCH, etc. using the default DMRS notified through the PBCH until the UE is aware of a DMRS pattern to be used thereby.

Alternatively, the eNB may inform the UE of the default DMRS pattern through the SIB. In this case, the UE may receive the (e)PBCH, (e)PDCCH, or cell-specific PDSCH for the SIB using the CRS or using the legacy DMRS pattern. The UE may receive the ePDCCH, (e)PHICH, SIB, PDSCH, etc. using the default DMRS until the UE is aware of a DMRS pattern to be used thereby.

■ B. DMRS Patterns for UE Feedback (Candidate DMRS Patterns)

Figure 9:
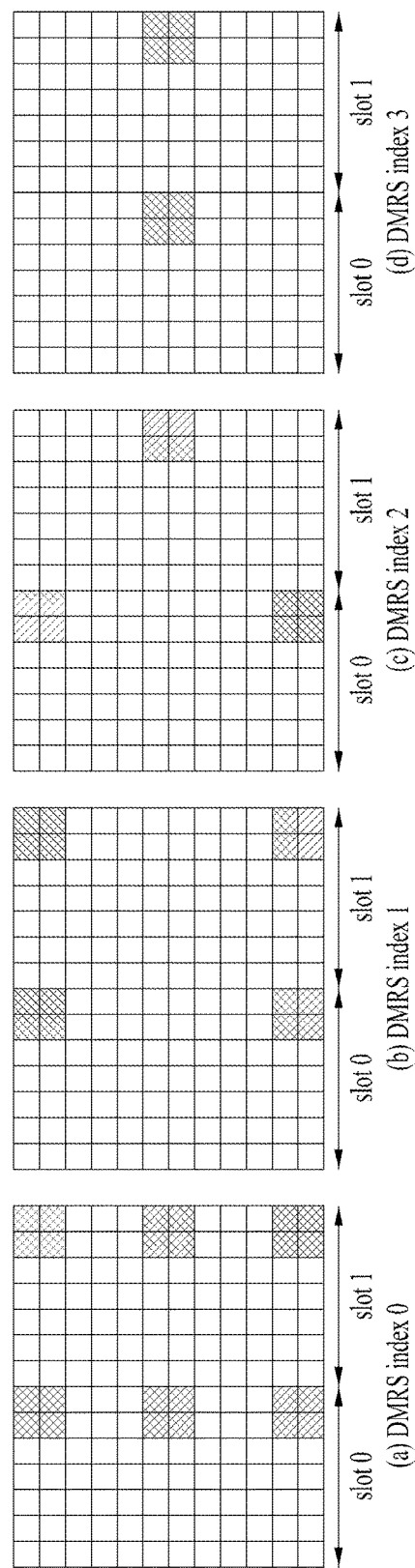
FIG. 9 illustrates candidate DMRS patterns for an embodiment of the present invention.

FIG. 9 illustrates candidate DMRS patterns for an embodiment of the present invention.

A UE may determine a DMRS pattern which is the most suitable for a channel environment thereof and feedback the determined DMRS pattern to an eNB. To this end, the UE may select one or multiple patterns from among K selectable DMRS patterns, i.e. K candidate DMRS patterns and inform the eNB of the selected patterns. For convenience of description, a candidate group of DMRS pattern(s) from which the UE can select a DMRS pattern suitable therefor will be referred to as candidate DMRS pattern(s).

The UE may not select the candidate DMRS pattern(s). Instead, the eNB may select the (entire K) candidate DMRS pattern(s) for the UE and inform the UE of the selected candidate DMRS pattern(s). The UE may select a DMRS pattern suitable for data transmission thereto among the candidate DMRS patterns indicated by the eNB and inform the eNB of the selected DMRS pattern. To this end, the eNB and the UE may pre-share N different DMRS patterns and the eNB may inform the UE of K candidate DMRS pattern (s) that the UE can select. Here, K may be less than or equal to N. To inform the UE of the candidate DMRS pattern(s), the eNB may inform the UE of index(es) of the K candidate DMRS pattern(s) or inform the UE of the K candidate DMRS pattern(s) that the UE can select by using a bitmap of N bits corresponding one to one to the N DMRS patterns. The K candidate DMRS pattern(s) of which the eNB informs the UE may be cell-specific or UE-specific.

If the candidate DMRS pattern(s) of which the eNB informs the UE is cell-specifically configured, the eNB may inform, through an SIB or an RRC signal, the UE of the K candidate DMRS pattern(s) that are selectable by the UE. Alternatively, if the candidate DMRS pattern(s) of which the eNB informs the UE are UE-specifically configured, the eNB may inform, through an RRC signal or a PDCCH, the UE of the K candidate DMRS pattern(s) for the UE. The K candidate DMRS pattern(s) may be reconfigured as needed once configured.

The eNB may inform the UE of the K candidate DMRS pattern(s) for the UE upon requesting that the UE feedback DMRS patterns. The K candidate DMRS pattern(s) may be reconfigured whenever the eNB requests that the UE feedback DMRS patterns.

For example, the eNB may inform the UE of four DMRS patterns of FIGS. 9(a) to 9(d) among total N DMRS patterns as DMRS patterns which are usable by the UE, i.e. as candidate DMRS patterns. The UE may select a DMRS pattern which is the most suitable therefor among the four DMRS patterns of which the eNB informs the UE and feedback an index of the selected DMRS pattern to the eNB.

Alternatively, the K candidate DMRS pattern(s) that are selectable by the UE may be predefined and pre-shared by the eNB and the UE. In this case, the eNB need not separately inform the UE of DMRS pattern(s) that are usable by the UE, i.e. candidate DMRS pattern(s).

Alternatively, the K candidate DMRS patterns that are selectable by the UE may be configured by a function. For example, if an index is assigned to each set of four DMRS REs defined by two successive subcarriers and two successive OFDM symbols on the assumption that a default DMRS pattern is as shown in FIG. 9(a), 6 DMRS RE sets in one PRB pair in FIG. 9(a) may be identified by DMRS indexes <0, 1, 2, 3, 4, 5>. For example, the DMRS indexes may be defined such that 'DMRS index 1=DMRS on subcarriers 5 and 6 and OFDM symbols 5 and 6 of the first slot (slot 0)', 'DMRS index 2=DMRS on subcarriers 10 and 11 and OFDM symbols 5 and 6 of the first slot (slot 0)', and 'DMRS index 3=DMRS on subcarriers 0 and 1 and OFDM symbols 5 and 6 of the second slot (slot 1)'. A prescheduled or predetermined function between the eNB and the UE, such as a random function or a hash function, may be used to extract the K DMRS patterns. For example, assuming that the DMRS indexes <0, 1, 2, 3, 4, 5> correspond to a 6-bit bitmap, 4 indexes among 6 indexes may be defined to be selected according to a function 'f(i)=<rand ( )% 6, rand ( )% 6, rand ( )% 6, rand ( )% 6', a variable of which is DMRS index i. In this function, rand ( ) is a random number generation function for generating random numbers, for example, 0 to 32767 and '%' represents a modulus operator. When DMRS patterns are extracted using this function, a base DMRS pattern may be determined by a UE environment and reported CSI. The base DMRS pattern may be a default DMRS pattern and may be a DMRS pattern composed of a set of DMRS REs indicated by each DMRS index. In other words, the base DMRS pattern may be understood as a DMRS pattern for indicating a candidate DMRS pattern, using the default DMRS pattern and/or a DMRS pattern composed of a set of DMRS REs indicated by each DMRS index.

Candidate DMRS pattern(s) may be composed of the default DMRS pattern and/or patterns obtained by puncturing the default DMRS pattern.

Meanwhile, if a high rank is used for data transmission for a specific UE, channel estimation performance is degraded due to inter-layer interference and, thus, a denser DMRS pattern may be needed. To use a dense DMRS pattern, the types of the candidate DMRS pattern(s) for the UE may differ according to a rank indication (RI) value applied to the UE. For example, the candidate DMRS patterns for the UE may be differently configured according to an RI value which is to be applied in order for the eNB to transmit data to the UE. Alternatively, although the candidate DMRS patterns for the UE are invariant according to the RI value, if the RI value is greater than a specific value, a DMRS pattern for the UE may be defined to always apply a specific DMRS pattern. The specific DMRS pattern may be as follows by way of example.

a) If the RI value is greater than the specific value, a default DMRS pattern may always be used;

b) if the RI value is greater than the specific value, the DMRS pattern for the UE may always be a legacy DMRS pattern;

c) if the RI value is greater than the specific value, the DMRS pattern for the UE may be a DMRS pattern having the smallest index or the largest index among candidate DMRS pattern(s) for the UE; or d) if the RI value is greater than the specific value, the DMRS pattern for the UE may always be a DMRS pattern having the largest DMRS RE density among the candidate DMRS pattern(s) for the UE.

Further, the candidate DMRS patterns may be restricted by a reported CQI or according to an MCS value proposed in DCI of a subframe in which a measurement DMRS pattern is applied. The candidate DMRS patterns may be restricted by a combination of the RI and the MCS/CQI. In this case, the UE may test K candidate DMRS pattern(s) from indexes of DMRS patterns given as measurement DMRS patterns. The candidate DMRS patterns for the UE may be given in the form of a table. Tables 8 and 9 show candidate DMRS pattern indexes when it is assumed that DMRS indexes <0, 1, 2, 3, 4, 5> are assigned to positions of 6 DMRS RE sets in one-to-one correspondence. Referring to Tables 8 and 9 on the assumption that the DMRS pattern of FIG. 5 is given as a measurement DMRS pattern, an index of the measurement DMRS pattern is 'index=0'.

TABLE 8

Candidate DMRS Pattern Index with RI

| DMRS Pattern Index | RI = 1 | RI = 2 | RI = 4 | RI = 8 |
|---|---|---|---|---|
| 0 | <0, 1, 2, 3, 4, 5> | <0, 1, 2, 3, 4, 5> | <0, 1, 2, 3, 4, 5> | <0, 1, 2, 3, 4, 5> |
| 1 | <0, 1, 2, 3, 4> | <0, 1, 2, 3, 4> | <0, 2, 3, 4, 5> | <0, 2, 3, 4, 5> |
| 2 | <0, 2, 4, 5> | <0, 2, 4, 5> | <0, 2, 3, 4> | <0, 2, 3, 4> |
| 3 | <0, 3, 4> | <0, 3, 4> | | |
| 4 | <0, 1, 4> | <0, 1, 4> | | |
| 5 | <0, 2, 5> | <0, 2, 5> | | |
| 6 | <0, 2, 4> | <0, 2, 4> | | |

TABLE 9

Candidate DMRS Pattern Index with CQI

| DMRS Pattern Index | QPSK | 16QAM | 64QAM | 256QAM |
|---|---|---|---|---|
| 0 | <0, 1, 2, 3, 4, 5> | <0, 1, 2, 3, 4, 5> | <0, 1, 2, 3, 4, 5> | <0, 1, 2, 3, 4, 5, 6, 7, 8> |
| 1 | <0, 1, 2, 3, 4> | <0, 1, 2, 3, 4> | <0, 1, 2, 3, 4> | <0, 1, 2, 3, 4, 5, 6, 8> |
| 2 | <1, 2, 4> | <0, 2, 4, 5> | | <0, 1, 2, 3, 4, 5> |
| 3 | <0, 3, 4> | <0, 3, 4> | | |
| 4 | <0, 1, 4> | <0, 1, 4> | | |

In Table 9, DMRS indexes <0, 1, 2, 3, 4, 5, 6, 7, 8> show DMRS indexes when it is assumed that three DMRS RE sets are added. If K=3, patterns of DMRS pattern indexes 0, 1, and 2 may be tested as candidate patterns. In other words, if K=3, three DMRS patterns serve as the candidate DMRS patterns. For example, three DMRS patterns starting from the lowest index, i.e. DMRS patterns corresponding to DMRS pattern indexes 0, 1, and 2 become the candidate DMRS patterns. The configuration of REs of the candidate DMRS patterns may differ according to an RI or an MCS as shown in Tables 8 and 9.

If an RI and a CQI are used in combination, common DMRS pattern(s) (i.e. intersection) or all DMRS patterns (i.e. union) of the candidate DMRS patterns in Tables 8 and 9 may be used as K DMRS pattern(s). If it is assumed that DMRS pattern(s) that satisfy both the RI and the CQI are used as the candidate DMRS pattern(s), for example, when CQI=16QAM, RI=2, and K=3, a DMRS pattern composed of DMRS REs of DMRS indexes <0, 1, 2, 3, 4> and a DMRS pattern composed of DMRS REs of DMRS indexes <0, 2, 4, 5> are measured and reported based on DMRS pattern(s) having high density or on the lowest DMRS index(es), in addition to a base DMRS pattern.

The candidate DMRS pattern(s) may be tested even in a PRB bundling window. For example, when the PRB bundling window is 3, the candidate DMRS pattern(s) may be separately tested with respect to the case in which each candidate DMRS pattern is applied to three PRBs, the case in which each candidate DMRS pattern is applied to two PRBs, and the case in which each candidate DMRS pattern is applied to one PRB. For reference, when the bundling window is 3, if a DMRS pattern is applied only to two PRBs or one PRB, it may be assumed in a PRB to which the DMRS pattern is not applied that 1) a default or base DMRS pattern is applied or that 2) DMRS puncturing (no DMRS) is applied. Whether the candidate DMRS pattern(s) will be tested in the PRB bundling window may be determined based on the RI or the CQI (e.g. if RI=4 or 8, PRB bundling DMRS reduction is not applied) or based on UE mobility or Doppler spread. If a DMRS can be transmitted in fewer PRBs than the bundling window by applying the candidate DMRS patterns to PRB bundling, the UE may report this to the eNB. A more detailed description will be given in section D.

C. DMRS Pattern Feedback Request (Measurement DMRS Patterns)

To cause a UE to feed back a DMRS pattern suitable for a channel environment of the UE, an eNB may request that the UE feedback the DMRS pattern. The UE may recognize that the UE should feedback the DMRS pattern suitable therefor by receiving information indicating a DMRS pattern feedback request from the eNB through an RRC signal or a PDCCH and may perform DMRS pattern feedback. The eNB may transmit information about a feedback timing and candidate DMRS pattern(s) for the UE, together with the DMRS pattern feedback request or in the form of being included in the DMRS pattern feedback request, so that the UE may feedback the DMRS pattern suitable for a channel environment thereof.

The eNB may request that the UE periodically perform DMRS pattern feedback. Characteristically, the eNB may request through an RRC signal that the UE periodically feedback a DMRS pattern. The eNB may transmit, to the UE, information about subframe locations (e.g. a subframe period and/or a subframe offset (a start subframe among a predetermined number of subframes)) in which the UE is to perform DMRS feedback, information about a PUCCH resource on which the UE is to transmit DMRS pattern feedback information, information about candidate DMRS patterns, information about subframe locations (e.g. a subframe period and/or a subframe offset) in which the UE is to perform measurement for selecting a suitable DMRS pattern, and information about a PRB bundle location, together with the DMRS pattern feedback request or in the form of being included in the DMRS pattern feedback request. If CA is configured, the eNB may request that the UE independently perform periodic DMRS pattern feedback with respect to each activated CC.

The eNB may also request that the UE periodically perform DMRS pattern feedback. For example, the eNB may request, through an RRC signal or a PDCCH, that the UE periodically feedback a DMRS pattern. In this case, the eNB may inform the UE of a subframe location in which the UE is to perform DMRS feedback. Alternatively, upon receiving an aperiodic DMRS pattern feedback request from the eNB in subframe #n, the UE may perform DMRS pattern feedback through a PUSCH resource of subframe #(n+k) (e.g. k=4). The eNB may transmit information about a PUCCH resource or a PUSCH resource on which the UE is to perform DMRS feedback and information indicating candidate DMRS pattern(s) together with the DMRS pattern feedback request. If CA is configured, the eNB may request that the UE independently perform aperiodic DMRS pattern feedback with respect to each activated CC. Alternatively, the eNB may inform the UE of information about CC(s) on which aperiodic DMRS pattern feedback is to be performed upon requesting DMRS pattern feedback.

Upon performing periodic CSI reporting, the UE may also perform DMRS pattern feedback. Alternatively, upon performing aperiodic CSI reporting by receiving aperiodic CSI report triggering, the UE may also perform DMRS pattern feedback. To this end, the eNB may transmit the above-mentioned information necessary for DMRS pattern feedback upon requesting CSI reporting. The UE may also perform DMRS pattern feedback upon transmitting a periodic SRS. Alternatively, the UE may perform DMRS pattern feedback upon transmission of an aperiodic SRS. To this end, the eNB may transmit the above-mentioned information necessary for DMRS pattern feedback upon requesting the periodic/aperiodic SRS.

The DMRS pattern feedback request may be implicitly transmitted through a CSI request field transmitted over a PDCCH. When the CSI request field is composed of one bit, the UE may interpret through the following methods that DMRS pattern feedback has been requested:
  a) if the value of the CSI request field is '1'; or
  b) if the value of the CSI request field is '1' and if DMRS pattern feedback is configured to be triggered by RRC when the value of the CSI request field is '1'.

When the CSI request field is composed of two bits, the UE may interpret through the following methods that DMRS pattern feedback has been requested:
  a) if the value of the CSI request field is not '0';
  b) if the value of the CSI request field is '1';
  c) if whether to trigger DMRS pattern feedback in the value of a specific CSI request field is designated and if the value of the CSI request field is a value triggering DMRS pattern feedback; or
  d) if whether to trigger DMRS pattern feedback in the value of a specific CSI request field is configured by RRC and if the value of the CSI request field is a value triggering DMRS pattern feedback.

Candidate DMRS pattern(s) for the UE may differ according to an RI value. Upon requesting that the UE perform DMRS pattern feedback, the eNB may transmit an RI value to be considered by the UE for DMRS pattern feedback in the form of being included in an (e)PDCCH.

The eNB may inform, through DCI, the UE of an index of a DMRS pattern to be used as a measurement DMRS pattern which is a DMRS pattern transmitted to the UE for DMRS measurement by the UE, designate the index through higher layer signalling, or pre-designate the index as a DMRS pattern associated with an RI and a CQI. Alternatively, it may be assumed that a DMRS pattern of 'index=0' is a base pattern or a measurement DMRS pattern in the form of a table. For example, if it is assumed that DMRS pattern(s) are determined in the form of Table 8 and/or Table 9, the UE may assume the DMRS pattern of 'index=0' as the base measurement DMRS pattern. Alternatively, the UE may find out the base DMRS pattern for measurement by performing blind decoding. The base DMRS pattern is meaningful in that a start point for determining candidate DMRS pattern(s) to be tested by the UE is designated. The candidate DMRS pattern may be composed of a subset of DMRS REs of the base DMRS pattern. Therefore, the candidate DMRS patterns of the UE may differ according to the type of the base DMRS pattern. Antenna port(s) to be used for DMRS transmission may be detected through the DCI. The UE may be aware of a subframe in which a predefined measurement DMRS pattern is configured, i.e. DMRS transmission occurs according to the measurement DMRS pattern, and a resource by scheduling DL data using the DCI. If a PDSCH is not present in a designated subframe (and, therefore, the base measurement DMRS pattern is not designated), the UE may skip channel measurement using a DMRS or perform channel measurement using a DMRS pattern transmitted in a previous measurement subframe. In the present invention, a DMRS measurement subframe refers to a subframe in which the UE selects or determines a DMRS pattern suitable for a channel state thereof among candidate DMRS patterns.

D. DMRS Pattern Selection and Feedback

DMRS Measurement Subframe

To select the most suitable DMRS pattern, a UE may use a DMRS measurement subframe. More specifically, the UE may select the most suitable DMRS pattern using the DMRS measurement subframe and feedback the DMRS pattern at a transmission timing of DMRS pattern feedback requested by an eNB. Characteristically, the DMRS measurement subframe may be UE-specific.

A bundle of multiple (successive) DL subframes may be configured as DMRS measurement subframes or one DL subframe may be configured as a DMRS measurement subframe. In one DMRS measurement subframe, all PRBs of a PDSCH region for a specific UE (e.g. RB(s) to which a PDSCH for the UE is mapped) may be used for DMRS measurement or some PRBs or some PRB bundles of the PDSCH region for the specific UE may be used for DMRS measurement.

To select a DMRS pattern which is most suitable for the UE by using the DMRS measurement subframe, the UE needs to be aware of a location of the DMRS measurement subframe. To this end, the eNB may inform, through an RRC signal or a PDCCH, the UE of information about locations of DMRS measurement subframes (e.g. a subframe period and/or a subframe offset) or locations of subframe bundles (e.g. a subframe bundle period, a subframe bundle offset (a start subframe of subframe bundles among a predetermined number of subframes), and/or the size of subframe bundles). The eNB may inform the UE of information about locations of PRBs or locations of PRB bundles in which DMRS measurement can be performed in a DMRS measurement subframe. In other words, the eNB may provide, to the UE, DMRS measurement resource information indicating subframe(s) and/or PRB(s) to be used to derive a DMRS pattern for DMRS pattern feedback by the UE.

The location(s) of PRBs and/or PRB bundles in which DMRS measurement can be performed may differ according to a DMRS measurement subframe. For example, the locations of PRBs or PRB bundles in which DMRS measurement can be performed in DMRS measurement subframe 'n+1' may be set by cyclic shifting the locations of PRBs or PRB bundles in which DMRS measurement can be performed in DMRS measurement subframe 'n' or by frequency hopping (according to a specific pattern).

In the DMRS measurement subframe, a PDSCH may be transmitted to the UE that is to perform DMRS measurement through given PRB(s). The PDSCH may be transmitted using a transmission scheme based on DMRS demodulation. For example, DMRS(s) transmitted in PRB(s) for transmission of the PDSCH may be precoded by the same precoder (i.e. the same precoding matrix) as transmission layers carried by the PDSCH. Data in the PDSCH may be generated using a transport block provided by a higher layer or generated using random data which is not provided by a higher layer.

The UE may determine which DMRS pattern among candidate DMRS pattern(s) is the most suitable for the UE by demodulating the PDSCH in RB(s) used for DMRS measurement in the DMRS measurement subframe through a DMRS pattern which can be selected by the UE (i.e. candidate DMRS pattern). If the number of DMRS patterns which can be used for DMRS pattern selection is K, a DMRS pattern used in RB(s) to which the PDSCH for the UE is mapped among RB(s) used for DMRS measurement in the DMRS measurement subframe may be as follows.

First, a DMRS pattern used in RB(s) for DMRS measurement in the DMRS measurement subframe may be transmitted in the form of a union of K candidate DMRS pattern(s). In other words, a measurement DMRS pattern used to derive a DMRS pattern preferred by the UE may correspond to a union of the candidate DMRS pattern(s). For example, if the candidate DMRS patterns for the UE are given as four DMRS patterns shown in FIG. 9, a DMRS pattern used in RB(s) for DMRS measurement in the DMRS measurement subframe may be the DMRS pattern of FIG. 9(*a*) which is a union of the four DMRS patterns. If the eNB transmits a DMRS according to the DMRS pattern of FIG. 9(*a*), the UE receives the DMRS according to the DMRS pattern of FIG. 9(*a*). In addition, to estimate performance of each of the DMRS pattern of FIG. 9(*a*), the DMRS pattern of FIG. 9(*b*), the DMRS pattern of FIG. 9(*c*), and the DMRS pattern of FIG. 9(*d*), the UE may use the received DMRS patterns for data demodulation by performing puncturing so as to generate each DMRS pattern. For example, referring to FIGS. 9(*a*) and 9(*b*), the UE that has received the DMRS according to the DMRS pattern of FIG. 9(*a*) may use, for data demodulation, a DMRS which is to be acquired by puncturing signals received on REs defined by subcarriers 5 and 7 and OFDM symbols 5 and 6 of slot 0 and signals received on REs defined by subcarriers 5 and 7 and OFDM symbols 5 and 6 of slot 1 among DMRS REs.

Figure 10:
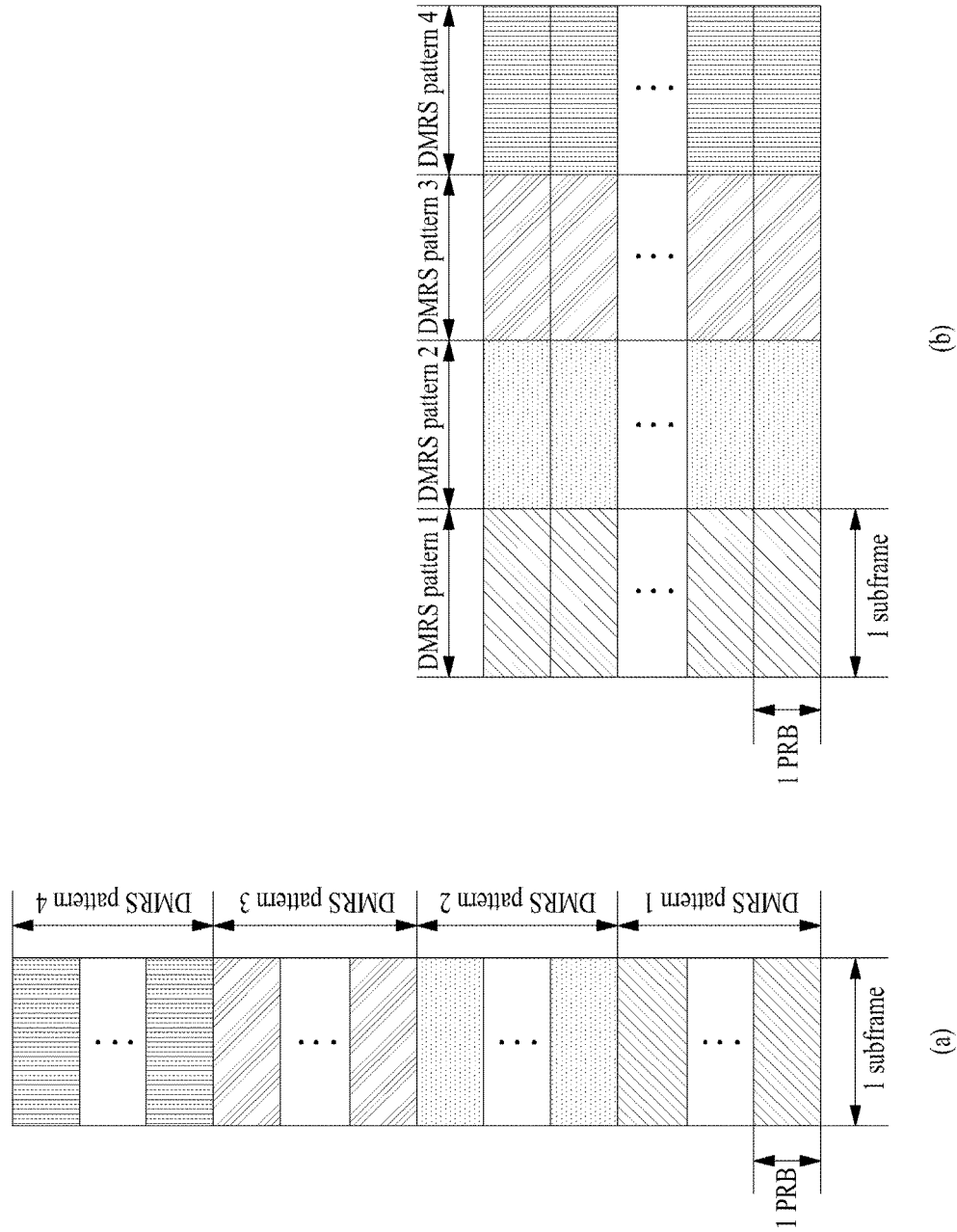
FIG. 10 illustrates an example of using DMRS pattern(s) according to an embodiment of the present invention.

FIG. 10 illustrates an example of using DMRS pattern(s) according to an embodiment of the present invention.

A different DMRS patterns may be used per PRB, per multiple PRBs, or per PRB bundle among RB(s) for DMRS measurement in the DMRS measurement subframe. The used DMRS pattern(s) may be composed of candidate DMRS pattern(s) for the UE. For example, as illustrated in FIG. 10(*a*), DMRS pattern 1 may be transmitted (i.e. a DMRS is transmitted according to DMRS pattern 1) in multiple PRBs or in a PRB bundle in RB(s) used for DMRS measurement and DMRS pattern 2 may be transmitted in another group of multiple PRBs or in another PRB bundle. The UE may select a DMRS pattern which is the most suitable therefor by performing demodulation using a different DMRS pattern per multiple PRBs or per PRB bundle.

In a DMRS pattern used in RB(s) for DMRS measurement in the DMRS measurement subframe, a different DMRS pattern per subframe, per multiple subframes, or per subframe bundle may be transmitted. In this case, the used DMRS pattern(s) may be composed of candidate DMRS pattern(s) for the UE. For example, if a plurality of subframes used for DMRS measurement is configured as illustrated in FIG. 10(*b*), DMRS pattern 1 may be transmitted in the first subframe and DMRS pattern 2 may be transmitted in the second subframe. The UE may select a DMRS pattern which is the most suitable therefor by attempting to perform demodulation using a different DMRS pattern per subframe, per multiple subframes, or per subframe bundle.

A DMRS transmitted in RB(s) for DMRS measurement in a DMRS measurement subframe may be transmitted as follows. If a DMRS pattern that the eNB desires to transmit to the UE is present, a DMRS pattern obtained by cyclic shifting an original DMRS pattern in the time/frequency domain may be transmitted in RB(s) used for DMRS measurement in the DMRS measurement subframe. Instead, DMRS RE(s) according to the original DMRS pattern may be configured as null REs on which no signals are transmitted. In other words, transmit powers of RE(s) other than DMRS REs according to the cyclic shifted DMRS pattern among the RE(s) according to the original DMRS pattern may be set to zero and the UE may perform demodulation on the assumption that transmit powers of the RE(s) other than the DMRS REs according to the cyclic shifted DMRS pattern among the RE(s) according to the original DMRS pattern are zero. The UE may estimate interference in an RE location at which a DMRS (of a corresponding cell) is actually transmitted by using the null REs for measurement of interference generated from neighbouring cells. The UE may determine the best DMRS pattern therefor to be fed back to the eNB by factoring in interference information.

Figure 11:
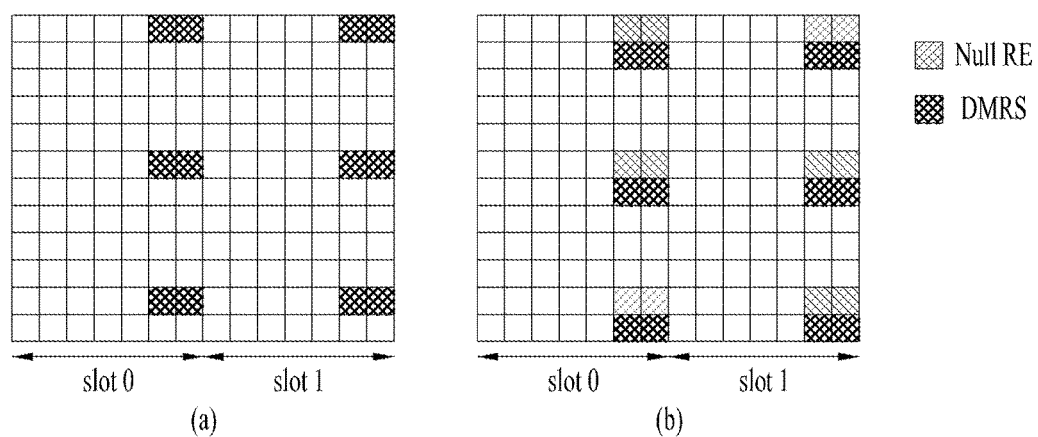
FIG. 11 illustrates another example of using DMRS pattern(s) according to an embodiment of the present invention.

FIG. 11 illustrates another example of using DMRS pattern(s) according to an embodiment of the present invention.

For example, if it is assumed that a DMRS for one antenna port as illustrated in FIG. 11(*a*) can be transmitted for DMRS measurement for a UE, an eNB may transmit a DMRS pattern obtained by cyclic shifting a DMRS pattern of FIG. 11(*a*) along the frequency domain as illustrated in FIG. 11(b), instead of transmitting the DMRS pattern of FIG. 11(a), in RB(s) used for DMRS measurement in a DMRS measurement subframe. This operation is possible because, generally, shift of a DMRS RE location by about one RE in channel estimation does not make any difference in channel estimation performance and, thus, it may be assumed that DMRS pattern performance of FIG. 11(a) is similar to DMRS pattern performance of FIG. 11(b). Instead, DMRS REs according to the DMRS pattern of FIG. 11(a) may be set to null REs (i.e. zero-power REs) on which no signals are transmitted. The UE may estimate interference in an RE location at which a DMRS is actually transmitted by using the null REs. In performing channel estimation, the UE estimates performance of the DMRS pattern in consideration of this interference. If there is weak interference (e.g. if interference is less than a predetermined threshold value), interference measured on the null REs may be disregarded on the assumption that an interference environment of the null REs is not greatly different from an interference environment of the DMRS REs. Although the DMRS pattern of FIG. 11(a) is used as a measurement DMRS, the UE may assume that a DMRS pattern actually transmitted in a measurement subframe (together with a PDSCH) is the same as the DMRS pattern of FIG. 11(b).

Candidate DMRS pattern(s) for the UE may differ according to an RI and/or a CQI. For example, in order to inform the UE of configuration of a DMRS pattern transmitted through PRB(s) used for DMRS measurement in a DMRS measurement subframe, the eNB may transmit the RI and/or the CQI to be considered by the UE for DMRS pattern feedback through the DMRS measurement subframe in the form of being included in an (e)PDCCH transmitted to the UE.

If the candidate DMRS pattern(s) for the UE vary with the RI and/or the CQI, configuration of a DMRS pattern transmitted through PRB(s) used for DMRS measurement in a DMRS measurement subframe may also differ according to value(s) of the RI and/or the CQI. To determine configuration of the DMRS pattern transmitted through the DMRS measurement subframe, the UE needs to be aware of the value(s) of the RI and the CQI considered by the eNB in the DMRS measurement subframe. In order for the UE to determine configuration of the DMRS pattern transmitted in the DMRS measurement subframe, the RI and/or the CQI considered in the DMRS measurement subframe may be determined by the following criterion:

a) an RI value and/or a CQI value for DMRS feedback transmitted through an (e)PDCCH of the DMRS measurement subframe; or b) an RI value applied to a PDSCH most recently transmitted to the UE prior to the DMRS measurement subframe.

Feedback for DMRS Puncturing on a PRB Basis

In the above criterion, for example, the RI value for DMRS feedback may be acquired through an 'antenna port(s), scrambling, and number-of-layers' field included in a DCI format carried by the (e)PDCCH. In other words, the RI value may be acquired based on the number of antenna ports. In the above criterion, for example, the CQI value may be obtained based on an MCS index (or a modulation order).

Figure 12:
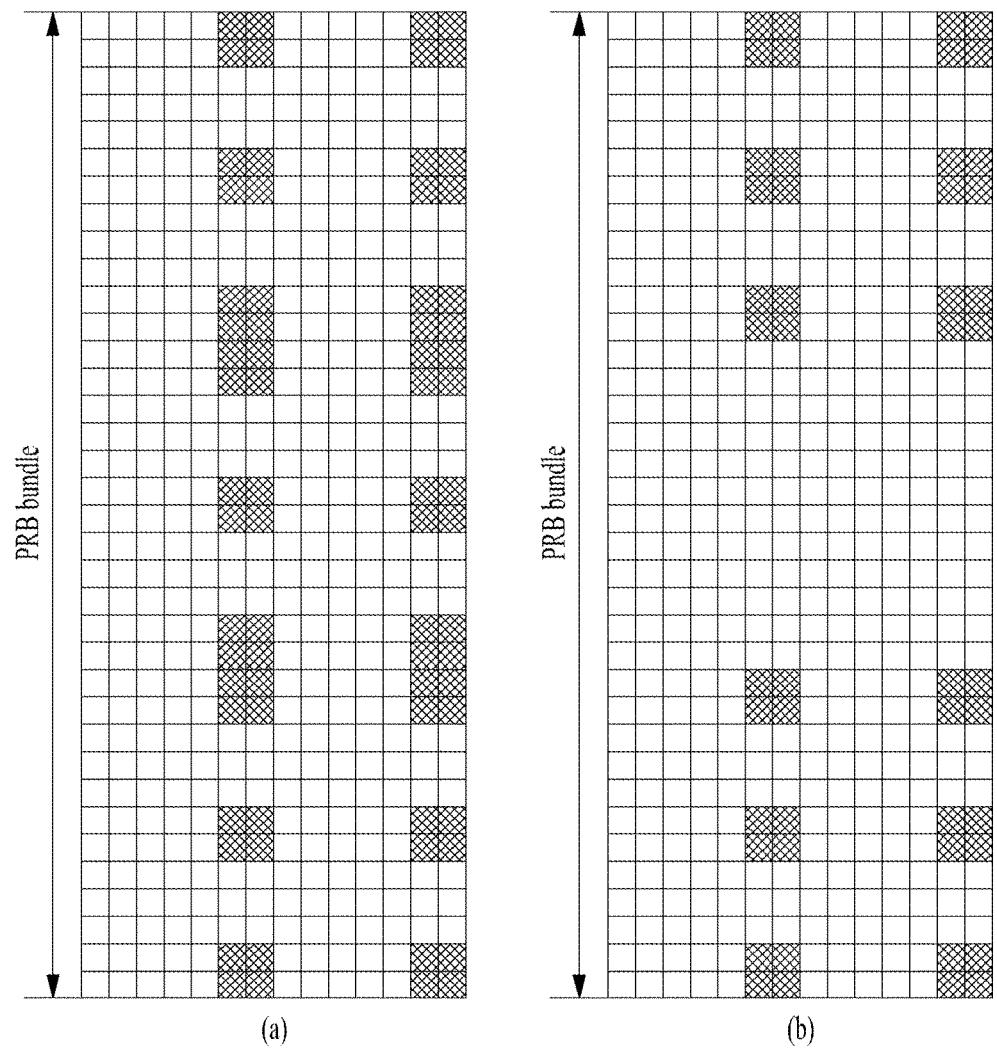
FIG. 12 illustrates still another example of using DMRS pattern(s) according to an embodiment of the present invention.

FIG. 12 illustrates still another example of using DMRS pattern(s) according to an embodiment of the present invention.

In DMRS patterns used for data demodulation of the UE, DMRSs may be located in different REs in one RB and the DMRSs may be transmitted in the same form, i.e. through the same RE locations, in RBs to which one PDSCH is mapped or in RBs in one PRB bundle. However, a DMRS pattern used for data demodulation of the UE may be transmitted only in some RB(s). For example, as compared with legacy DMRSs transmitted in a PRB bundle as in FIG. 12(a), DMRSs according to an embodiment of the present invention may be transmitted only in some RB(s) in one PRB bundle as illustrated in FIG. 12(b). In this case, the UE may inform the eNB of information indicating on which RB(s) in one PRB bundle it is desirable or undesirable to transmit a DMRS. For example, the UE may separately inform the eNB of information about a PRB in which a DMRS is transmitted or is not transmitted within a PRB bundle with respect to each PRB bundle of a PDSCH region given to the UE (e.g. RB(s) to which a PDSCH of the UE is allocated). For example, if the PDSCH region allocated to the UE is composed of M PRB bundle(s), the UE may inform the eNB of information about a DMRS transmission/non-transmission PRB location for each of the M PRB bundle(s). Later, upon transmitting the PDSCH to the UE in the same PDSCH region, the eNB may transmit a DMRS through some PRBs in each PRB bundle using the DMRS transmission/non-transmission PRB information indicated by the UE.

In order for the UE to aid in determining RB(s) necessary for DMRS transmission, the eNB may transmit a DMRS in all RB(s) used for DMRS measurement, for example, as in FIG. 11(a), upon transmitting a measurement DMRS pattern in a DMRS measurement subframe.

DMRS Pattern Feedback

The UE may transmit at least one of the following information a)~i) to the eNB during DMRS pattern feedback:

a) transmission of an index of one DMRS pattern which is the most suitable for the UE;

b) transmission of ACK/NACK indicating whether to successfully receive a PDSCH when a corresponding candidate DMRS pattern is applied per candidate DMRS pattern of K candidate DMRS pattern(s) for the UE;

c) transmission of indexes of all DMRS pattern(s) in which ACK occurs as a result of data demodulation;

d) transmission of indexes of all DMRS pattern(s) in which ACK occurs as a result of data demodulation by ordering the patterns in order of the most suitable DMRS patterns/least suitable DMRS patterns for the UE;

e) transmission of index(es) of L (where L≤K) DMRS pattern(s) which are the most suitable for the UE;

f) transmission of index(es) of L (where L≤K) DMRS pattern(s) which are the most suitable for the UE, together with ACK/NACK for the L DMRS patterns;

g) transmission of index(es) of L (where L≤K) DMRS pattern(s) which are the most suitable for the UE as a result of data demodulation, wherein the L DMRS pattern(s) are arranged in order of the most suitable/least suitable DMRS patterns for the UE;

h) transmission of index(es) of L (where L≤K) DMRS pattern(s) which are the most suitable for the UE as a result of data demodulation, together with the number of DMRS patterns in which ACK occurs among the L DMRS pattern(s) or ACK/NACK of each of the L DMRS patterns, wherein the L DMRS pattern(s) are arranged in order of the most suitable/least suitable DMRS patterns for the UE; or i) transmission of index(es) of L (where L≤K) DMRS pattern(s) which are the most suitable for the UE as a result of data demodulation, together with the number of DMRS patterns in which ACK occurs among the L DMRS pattern(s) or ACK/NACK of each of the L DMRS patterns, wherein DMRS pattern(s) in which ACK occurs among the L DMRS pattern(s) are arranged in order of the most suitable/least suitable DMRS patterns for the UE and only indexes of DMRS pattern(s) in which NACK occurs are indicated without ordering the DMRS patterns.

As mentioned in section B of the present invention, if the UE and the eNB pre-share K candidate DMRS patterns or if the eNB informs the UE of the K candidate DMRS pattern(s), the UE may feedback at least one of the above a) to i) using the K DMRS pattern(s).

For example, the eNB may inform the UE of the K candidate DMRS pattern(s) for the UE and the UE may feedback an index of a DMRS pattern which is the most suitable for the UE among the DMRS pattern(s) to the eNB.

As another example, if K candidate DMRS patterns are predefined and the eNB and the UE pre-share the K candidate DMRS patterns, the UE may feedback index(es) of L (L≤K) DMRS pattern(s) suitable for the UE among the K candidate DMRS patterns to the eNB.

The UE may feedback DMRS pattern information through a PUCCH or PUSCH resource. For example, upon performing DMRS pattern feedback, the UE may feedback the DMRS pattern information through the PUCCH resource. Upon performing CSI reporting through the PUCCH resource in a (UL) subframe which is a DMRS pattern feedback transmission timing, the UE may piggyback the DMRS pattern feedback information onto CSI reporting and then transmit the information on the PUCCH resource. In other words, if a DMRS pattern reporting timing and a CSI reporting transmission timing over a PUCCH collide, the UE may transmit the DMRS pattern information together with CSI reporting over the PUCCH carrying the CSI reporting. If a PUSCH of the UE is transmitted in a subframe in which DMRS pattern feedback is performed, the UE may piggyback the DMRS pattern feedback information onto the PUSCH and then transmit the information. In other words, if a transmission timing of the PUSCH allocated to the UE and a transmission timing of the DMRS pattern information collide, the UE may transmit the DMRS pattern information on the PUSCH.

Figure 13:
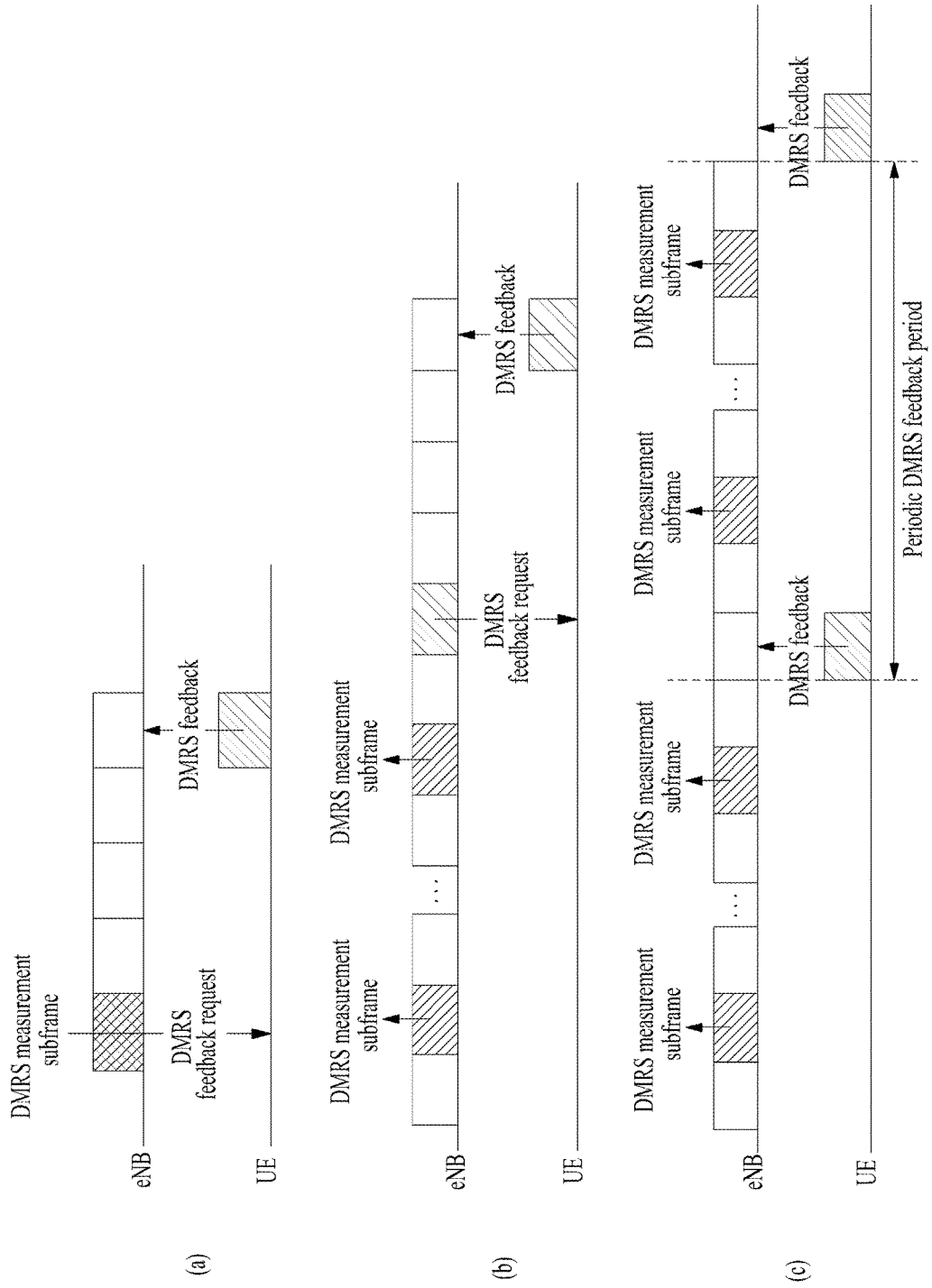
FIG. 13 illustrates DMRS feedback according to an embodiment of the present invention.

FIG. 13 illustrates DMRS feedback according to an embodiment of the present invention. Particularly, FIG. 13 illustrates DMRS measurement, DMRS pattern feedback request, and DMRS pattern feedback transmission.

To cause the UE to feed back a DMRS pattern suitable for the UE, the eNB may request periodically that the UE periodically feedback the DMRS pattern as illustrated in FIG. 13(a). The eNB may request DMRS pattern feedback through a PDCCH and a subframe in which DMRS pattern feedback is requested may be used as a DMRS measurement subframe. In this case, the eNB may inform the UE of PRB(s) or PRB bundle(s) in which DMRS measurement is to be performed among RBs of the DMRS measurement subframe. Upon reception of a DMRS pattern feedback request, the UE performs DMRS measurement in a subframe in which the DMRS pattern feedback request is received or in a subframe indicated by the DMRS pattern feedback request and selects one or multiple DMRS patterns which are the most suitable for a channel environment of the UE and/or DMRS transmission/non-transmission PRB locations in a PRB bundle. Next, the UE may perform DMRS feedback through a PUCCH or PUSCH resource after a predetermined number of subframes (e.g. 4 subframes).

To cause the UE to feed back a DMRS pattern suitable for the UE, the eNB may request periodically that the UE feedback the DMRS pattern as illustrated in FIG. 13(b). If the eNB informs the UE of information about locations of DMRS measurement subframe(s) and locations of RB(s) to be used for measurement (hereinafter, DMRS measurement RB(s)), the UE may use the corresponding subframe(s) and RB(s) to select the DMRS pattern which is the most suitable for the UE. Later, DMRS pattern feedback may be requested through a PDCCH by the eNB. For example, if the UE which has configured DMRS measurement subframes/RBs according to information about the DMRS measurement subframe(s) and/or the DMRS measurement RB(s) receives a DMRS pattern feedback request through the PDCCH while performing measurement in the DMRS measurement subframe(s), the UE may perform DMRS feedback using a measurement result which has been performed in a previous DMRS measurement subframe. Upon reception of the DMRS pattern feedback request, the UE may feedback one or multiple DMRS patterns and/or DMRS transmission/non-transmission PRB locations in a PRB bundle, selected using the previous DMRS measurement subframe, to the eNB. Upon receiving the DMRS pattern feedback request in subframe n, the UE may perform DMRS feedback through a PUCCH resource or a PUSCH resource in subframe n+k after k (e.g. 4) subframes.

To feed back a DMRS pattern suitable for the UE, the UE may perform periodic DMRS pattern feedback as illustrated in FIG. 13(c). To cause the UE to perform periodic DMRS pattern feedback, the eNB may inform the UE of information about locations of DMRS measurement subframe(s) and locations of DMRS measurement RB(s) and the UE may use the corresponding subframe(s) and corresponding RB(s) to select the most suitable DMRS pattern. The eNB may also inform the UE of information about subframe locations (e.g. subframe period and/or offset) in which the UE is to perform DMRS feedback. At a timing when DMRS pattern feedback should be performed, the UE may feedback one or multiple DMRS patterns and/or DMRS transmission/non-transmission PRB locations, selected using the previous DMRS measurement subframe, to the eNB. For example, the UE may periodically perform DMRS pattern feedback through a PUCCH resource.

To determine a DMRS pattern which is the most suitable for a channel environment of the UE, the UE may use a previous DMRS measurement subframe. In this case, the DMRS measurement subframe to be used by the UE may be as follows:

a) unrestricted measurement—The UE may perform DMRS pattern feedback by unrestrictedly using DMRS measurement subframes prior to a subframe in which DMRS pattern feedback is performed;

b) using only DMRS measurement subframe(s) of a given interval—The UE may perform DMRS pattern feedback using only DMRS measurement subframe(s) included in W subframes (subframe n−W+1 to subframe n or subframe n−W to subframe n−1) (where W is the number of subframes corresponding to the given interval) prior to subframe n in which a DMRS pattern feedback request is received or may perform DMRS pattern feedback using only DMRS measurement subframe(s) belonging to W subframes (subframe n'−W+1 to subframe n' or subframe n'−W to subframe n'−1) prior to subframe n' in which DMRS pattern feedback is performed; or c) a last scheduled DMRS measurement subframe—The UE may perform DMRS pattern feedback using only the latest DMRS measurement subframe prior to subframe n (subframe n may be included or excluded) in which the DMRS pattern feedback request is transmitted or perform DMRS pattern feedback using only the latest DMRS measurement subframe prior to a subframe in which DMRS pattern feedback is performed.

Candidate DMRS patterns for the UE may differ according to an RI value. The RI value used by the UE to determine the candidate DMRS pattern may be determined using the following criteria:

a) an RI value for DMRS feedback transmitted through an (e)PDCCH carrying a DMRS pattern feedback request;

b) an RI value transmitted through an (e)PDCCH transmitted in the latest DMRS measurement subframe before the UE receives the DMRS pattern feedback request from the eNB, c) an RI value transmitted through an (e)PDCCH transmitted in the latest DMRS measurement subframe before the UE transmits DMRS pattern feedback to the eNB;

d) an RI value applied to a PDSCH most recently transmitted to the UE (e.g. the number of layers mapped to the PDSCH or the number of DMRS antenna ports) before the UE receives the DMRS pattern feedback request from the eNB;

e) an RI value applied to a PDSCH most recently transmitted to the UE (e.g. the number of layers mapped to a PDSCH or the number of DMRS antenna ports) before the UE transmits DMRS pattern feedback to the eNB;

f) an RI value most recently reported by the UE before the UE receives the DMRS pattern feedback request from the eNB; or g) an RI value most recently reported by the UE before the UE transmits DMRS pattern feedback to the eNB.

Upon reporting information about a DMRS pattern which is the most suitable for a channel environment of the UE to the eNB, the UE may also report the RI value. In addition, the reported information about the DMRS pattern may be joint-encoded with the reported RI value before transmission. Therefore, the eNB may use the RI value reported by the UE in order to obtain the information about the DMRS pattern that the UE feeds back. A DMRS pattern indicated by an index of the DMRS pattern which has been fed back by the UE may differ according to the RI value which also has been fed back by the UE.

In the embodiments of the present invention, the UE operates as the transmitting device 10 in UL and as the receiving device 20 in DL. In the embodiments of the present invention, the eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The UE processor according to the present invention may select a preferred DMRS pattern from among candidate DMRS patterns. The candidate DMRS patterns may be patterns which are prestored in the UE memory and the eNB memory, selected by the UE processor, or configured based on candidate DMRS pattern configuration information received from the eNB. The candidate DMRS patterns may have different DMRS densities (or DMRS RE densities) and/or different RE locations occupied by DMRSs in a predetermined time-frequency resource (e.g. an RB pair). The UE processor may control the UE RF unit to transmit DMRS information including the preferred DMRS pattern. The UE processor may control the UE RF unit to transmit the DMRS information together with CSI or separately through a PUCCH or a PUSCH according to an embodiment of the present invention.

The DMRS information may be transmitted as a response to a DMRS information reporting request. The DMRS information reporting request may be periodically or periodically performed. The DMRS information reporting request may include information indicating a time resource and/or a frequency resource for transmitting the DMRS information. If the UE RF unit receives the DMRS information reporting request, the UE processor may derive the DMRS information and control the UE RF unit to transmit the DMRS information in a subframe corresponding to a DMRS information transmission timing based on the DMRS information reporting request. DMRS measurement resource information indicating a DMRS resource carrying a DMRS used to derive the DMRS information or a reference resource which is a reference for deriving the DMRS information may be received by the UE RF unit together with the DMRS information reporting request or separately. The DMRS measurement resource information may include information indicating a DMRS measurement subframe for deriving the DMRS information and/or information indicating a frequency resource (e.g. RB(s)) for deriving the DMRS information. The UE processor may receive a DMRS in REs according to a measurement DMRS pattern in a DMRS measurement subframe based on the DMRS measurement resource information. The measurement DMRS pattern may be a pattern including all REs of the candidate DMRS patterns. The measurement DMRS pattern may be a pattern configured to include a union of at least the candidate DMRS patterns.

The eNB processor according to the present invention may cause the eNB RF unit to receive DMRS information reported by the UE. The DMRS information may include indication information indicating a DMRS pattern preferred by the UE among candidate DMRS patterns. The candidate DMRS patterns may be prestored in the UE memory and the eNB memory, selected by the UE processor and reported to the eNB, or configured by the eNB processor and may be configured for the UE using candidate DMRS pattern configuration information. The candidate DMRS patterns may have different DMRS densities (i.e. DMRS RE densities) and/or different RE locations occupied by DMRSs in a predetermined time-frequency resource (e.g. an RB pair). The eNB processor may control the eNB RF unit so that the DMRS information may be received through a PUCCH or a PUSCH together with CSI or separately according to an embodiment of the present invention.

The eNB processor may control the eNB RF unit to transmit a DMRS information reporting request for requesting that the UE report the DMRS information. The DMRS information reporting request may be periodically or periodically performed. The DMRS information reporting request may include information indicating a time resource and/or a frequency resource for transmitting the DMRS information. The eNB processor may control the eNB RF unit to receive the DMRS information in a subframe corresponding to a DMRS information reporting reception timing according to the DMRS information reporting request. The eNB processor may control the eNB RF unit to transmit DMRS measurement resource information indicating a DMRS resource carrying a DMRS used to derive the DMRS information or a reference resource which is a reference for deriving the DMRS information, together with the DMRS information reporting request or separately. The DMRS measurement resource information may include information indicating a DMRS measurement subframe for deriving the DMRS information and/or information indicating a frequency resource (e.g. RB(s)) for deriving the DMRS information. The eNB processor may control the eNB RF unit to transmit the DMRS according to the DMRS measurement resource information. The eNB processor may control the eNB RF unit to transmit the DMRS according to a measurement DMRS pattern in a DMRS measurement subframe (on DMRS measurement RB(s)). The measurement DMRS pattern may be a pattern configured to include a union of the candidate DMRS patterns.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to an eNB, a UE, or other devices in a wireless communication system.

The invention claimed is:

1. A method for reporting demodulation reference signal (DMRS) information by a user equipment (UE), the method comprising:
receiving a DMRS information reporting request; and
reporting the DMRS information indicating a DMRS pattern preferred by the UE among a plurality of DMRS patterns based on the DMRS information reporting request,
wherein, when a rank indicator (RI) is greater than a threshold value, the DMRS pattern preferred by the UE is a specific DMRS pattern, and
wherein the specific DMRS pattern is a DMRS pattern having a largest DMRS resource element (RE) density among the plurality of DMRS patterns.

2. The method according to claim 1, further comprising:
receiving DMRS measurement resource information indicating a DMRS measurement resource for deriving the DMRS pattern; and
receiving a DMRS according to a measurement DMRS pattern for deriving the DMRS pattern on the DMRS measurement resource.

3. The method according to claim 2, wherein the DMRS measurement resource information includes at least DMRS measurement subframe information indicating a DMRS measurement subframe for deriving the DMRS pattern or resource block information indicating a resource block for deriving the DMRS pattern.

4. The method according to claim 2, wherein the measurement DMRS pattern corresponds to a union of the plurality of DMRS patterns.

5. The method according to claim 1, further comprising:
receiving DMRS pattern configuration information indicating the plurality of DMRS patterns.

6. The method according to claim 1, wherein the DMRS information is reported together with channel state information (CSI) indicating the RI and at least one of a channel quality indicator, or a precoding matrix indicator.

7. The method according to claim 1, wherein the DMRS information is reported separately from channel state information (CS I) including the RI and at least one of a channel quality indicator, or a precoding matrix indicator.

8. A user equipment (UE) for reporting demodulation reference signal (DMRS) information, the UE comprising:
a radio frequency (RF) unit configured to transmit and receive a radio signals; and
a processor configured to control the RF unit,
wherein the processor causes the RF unit to receive a DMRS information reporting request and control the RF unit to report the DMRS information indicating a DMRS pattern preferred by the UE among a plurality of DMRS patterns based on the DMRS information reporting request,
wherein, when a rank indicator (RI) is greater than a threshold value, the DMRS pattern preferred by the UE is a specific DMRS pattern,
wherein the specific DMRS pattern is a DMRS pattern having a largest DMRS resource element (RE) density among the plurality of DMRS patterns.

9. The user equipment according to claim 8, wherein the processor causes the RF unit to receive DMRS measurement resource information indicating a DMRS measurement resource for deriving the DMRS pattern and controls the RF unit to receive a DMRS according to a measurement DMRS pattern for deriving the DMRS pattern on the DMRS measurement resource.

10. The user equipment according to claim 9, wherein the DMRS measurement resource information includes at least DMRS measurement subframe information indicating a DMRS measurement subframe for deriving the DMRS pattern or resource block information indicating a resource block for deriving the DMRS pattern.

11. The user equipment according to claim 9, wherein the measurement DMRS pattern corresponds to a union of the plurality of DMRS patterns.

12. The user equipment according to claim 8, wherein the user equipment to further receive DMRS pattern configuration information indicating the plurality of DMRS patterns.

13. The user equipment according to claim 8, wherein the DMRS information is reported together with channel state information (CSI) indicating the RI and at least one of a channel quality indicator, or a precoding matrix indicator.

14. The user equipment according to claim 8, wherein the DMRS information is reported separately from channel state information (CSI) including the RI and at least one of a channel quality indicator, or a precoding matrix indicator.

15. A method for receiving demodulation reference signal (DMRS) information by a base station (BS), the method comprising:
transmitting a DMRS information reporting request; and
receiving the DMRS information indicating a DMRS pattern preferred by a user equipment (UE) among a plurality of DMRS patterns based on the DMRS information reporting request,
wherein, when a rank indicator (RI) is greater than a threshold value, the DMRS pattern preferred by the UE is a specific DMRS pattern,
wherein the specific DMRS pattern is a DMRS pattern having a largest DMRS resource element (RE) density among the plurality of DMRS patterns.

16. A base station (BS) for receiving demodulation reference signal (DMRS) information, the base station comprising:
a radio frequency (RF) unit configured to transmit and receive a radio signals; and
a processor configured to control the RF unit,
wherein the processor controls the RF unit to transmit a DMRS information reporting request and controls the RF unit to receive the DMRS information indicating a DMRS pattern preferred by a user equipment (UE) among a plurality of DMRS patterns based on the DMRS information reporting request,
wherein, when a rank indicator (RI) is greater than a threshold value, the DMRS pattern preferred by the UE is a specific DMRS pattern,
wherein the specific DMRS pattern is a DMRS pattern having a largest DMRS resource element (RE) density among the plurality of DMRS patterns.

* * * * *